US012014692B2

(12) United States Patent
Yu et al.

(10) Patent No.: US 12,014,692 B2
(45) Date of Patent: Jun. 18, 2024

(54) DISPLAY DRIVING MODULE, METHOD FOR DRIVING THE SAME AND DISPLAY DEVICE

(71) Applicants: Chengdu BOE Optoelectronics Technology Co., Ltd., Sichuan (CN); BOE Technology Group Co., Ltd., Beijing (CN)

(72) Inventors: Pengfei Yu, Beijing (CN); Yi Zhang, Beijing (CN); Jie Dai, Beijing (CN); Lu Bai, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/626,467

(22) PCT Filed: Mar. 30, 2021

(86) PCT No.: PCT/CN2021/083958

§ 371 (c)(1),
(2) Date: Jan. 11, 2022

(87) PCT Pub. No.: WO2021/208729

PCT Pub. Date: Oct. 21, 2021

(65) Prior Publication Data

US 2023/0024029 A1 Jan. 26, 2023

(30) Foreign Application Priority Data

Apr. 15, 2020 (CN) ........................ 202010295348.3

(51) Int. Cl.
*G09G 3/3291* (2016.01)

(52) U.S. Cl.
CPC ... *G09G 3/3291* (2013.01); *G09G 2300/0426* (2013.01); *G09G 2300/0852* (2013.01);
(Continued)

(58) Field of Classification Search
CPC ......... G09G 3/3291; G09G 2300/0852; G09G 2310/0286; G09G 2310/0297; G09G 2320/0209
See application file for complete search history.

(56) References Cited

U.S. PATENT DOCUMENTS

2008/0062089 A1 3/2008 Kim et al.
2008/0180369 A1 7/2008 Chiu et al.
(Continued)

FOREIGN PATENT DOCUMENTS

CN 101145318 A 3/2008
CN 102707524 A 10/2012
(Continued)

OTHER PUBLICATIONS

CN 202010295348.3 first office action.
(Continued)

*Primary Examiner* — Benjamin C Lee
*Assistant Examiner* — Nathan P Brittingham
(74) *Attorney, Agent, or Firm* — IPro, PLLC

(57) ABSTRACT

A display driving module includes a gate driving circuit, a plurality of data lines and a data driving circuit. The pixel circuits in odd-numbered rows and one column are electrically connected to a data line, and the pixel circuits in even-numbered rows and the one column are electrically connected to another data line. The data driving circuit includes a data driver and a multiplexing circuit, the multiplexing circuit includes a first multiplexing sub-circuit and a second multiplexing sub-circuit. The gate driving circuit includes a plurality of levels of shift register units, and an
(Continued)

$n^{th}$-level shift register unit is electrically connected to the pixel circuits in a $(2n-1)^{th}$ row and a $(2n)^{th}$ row, and configured to apply a same gate driving signal to the pixel circuits in the $(2n-1)^{th}$ row and the $(2n)^{th}$ row, where n is a positive integer.

18 Claims, 10 Drawing Sheets

(52) U.S. Cl.
CPC ............... *G09G 2310/0286* (2013.01); *G09G 2310/0297* (2013.01); *G09G 2320/0209* (2013.01)

(56) References Cited

U.S. PATENT DOCUMENTS

| | | | | |
|---|---|---|---|---|
| 2008/0278466 | A1 | 11/2008 | Joo | |
| 2013/0335395 | A1 | 12/2013 | Zhan et al. | |
| 2014/0176410 | A1 | 6/2014 | Ma et al. | |
| 2015/0061983 | A1 | 3/2015 | Kim | |
| 2016/0300523 | A1 | 10/2016 | Tan et al. | |
| 2017/0278450 | A1* | 9/2017 | Ma | G09G 3/3677 |
| 2018/0114490 | A1 | 4/2018 | Sun | |
| 2018/0357974 | A1 | 12/2018 | Zheng | |
| 2019/0073939 | A1* | 3/2019 | Hu | G09G 3/3266 |
| 2020/0058250 | A1* | 2/2020 | Dong | G09G 3/3225 |
| 2021/0366354 | A1 | 11/2021 | Li et al. | |

FOREIGN PATENT DOCUMENTS

| | | | |
|---|---|---|---|
| CN | 103050106 | A | 4/2013 |
| CN | 104103253 | A | 10/2014 |
| CN | 104299595 | A | 1/2015 |
| CN | 104299652 | A | 1/2015 |
| CN | 104464601 | A | 3/2015 |
| CN | 104952406 | A | 9/2015 |
| CN | 105575329 | A | 5/2016 |
| CN | 105741802 | A | 7/2016 |
| CN | 106297697 | A | 1/2017 |
| CN | 107689217 | A | 2/2018 |
| CN | 207489447 | U | 6/2018 |
| CN | 109036281 | A | 12/2018 |
| CN | 109272960 | A | 1/2019 |
| CN | 209265989 | U | 8/2019 |
| CN | 110910775 | A | 3/2020 |
| CN | 110931542 | A | 3/2020 |
| CN | 111354309 | A | 6/2020 |

OTHER PUBLICATIONS

CN 202010295348.3 third office action.
PCT/CN2021/083958 international search report and written opinion.

* cited by examiner

DISPLAY DRIVING MODULE, METHOD FOR DRIVING THE SAME AND DISPLAY DEVICE

CROSS-REFERENCE TO RELATED APPLICATIONS

This application is the U.S. national phase of PCT Application No. PCT/CN2021/083958 filed on Mar. 30, 2021, which claims a priority Chinese Patent Application No. 202010295348.3 filed in China on Apr. 15, 2020, which is incorporated herein by reference in its entirety.

TECHNICAL FIELD

The present disclosure relates to the field of display technology, and in particular to a display driving module, a method for driving the display driving module and a display device.

BACKGROUND

Currently, a gaming phone equipped with a screen having a high frequency is one of hot spots in a mobile phone market. For a same animation, it shows smoother visual effects on the screen having the high frequency. However, in the case of the screen having the high frequency, it has a higher requirements on a display power consumption, a data charging time and a level of crosstalk. If a display of a conventional architecture is directly driven at the high frequency, it is unable to achieve good visual effects, and problems such as serious chromatic aberration and poor display uniformity caused by insufficient data charging time may occur.

In view of the above problems, a dual data line technical solution, in which pixel circuits in one column are controlled by two data lines, may be adopted. A screen refresh rate is doubled in the case that a frequency of a data voltage signal on each data line does not change. However, as the number of data lines increases, the crosstalk for display screen signal lines becomes more serious.

SUMMARY

A display driving module applied to a display device is provided in the present disclosure. The display device includes pixel circuits in multiple rows and multiple columns, the display driving module includes a gate driving circuit, and a plurality of data lines and a data driving circuit. The pixel circuits in odd-numbered rows and one column are electrically connected to a data line, and the pixel circuits in even-numbered rows and the one column are electrically connected to another data line. The data driving circuit includes a data driver and a multiplexing circuit, and the multiplexing circuit includes a first multiplexing sub-circuit and a second multiplexing sub-circuit. The first multiplexing sub-circuit is electrically connected to a first multiplexing control terminal, the data driver, the data lines electrically connected to the pixel circuits in odd-numbered rows and odd-numbered columns, and the data lines electrically connected to the pixel circuits in even-numbered rows and even-numbered columns, and configured to control the data driver to apply corresponding data voltages to the data lines electrically connected to the pixel circuits in odd-numbered rows and odd-numbered columns and the data lines electrically connected to the pixel circuits in even-numbered rows and even-numbered columns under the control of a first multiplexing control signal from the first multiplexing control terminal. The second multiplexing sub-circuit is electrically connected to a second multiplexing control terminal, the data driver, the data lines electrically connected to the pixel circuits in odd-numbered rows and even-numbered columns, and the data lines electrically connected to the pixel circuits in even-numbered rows and odd-numbered columns, and configured to control the data driver to apply corresponding data voltages to the data lines electrically connected to the pixel circuits in odd-numbered rows and even-numbered columns and the data lines electrically connected to the pixel circuits in even-numbered rows and odd-numbered columns under the control of a second multiplexing control signal from the second multiplexing control terminal. The gate driving circuit includes a plurality of levels of shift register units; and an $n^{th}$-level shift register unit is electrically connected to the pixel circuits in a $(2n-1)^{th}$ row and a $(2n)^{th}$ row, and configured to apply a same gate driving signal to the pixel circuits in the $(2n-1)^{th}$ row and the $(2n)^{th}$ row, where n is a positive integer.

In a possible embodiment of the present disclosure, the pixel circuits in odd-numbered rows and a $(2m-1)^{th}$ column are electrically connected to a $(4m-3)^{th}$ data line, the pixel circuits in even-numbered rows and the (2m−1)th column are electrically connected to a $(4m-2)^{th}$ data line, the pixel circuits in even-numbered rows and a $(2m)^{th}$ column are electrically connected to a $(4m-1)^{th}$ data line, the pixel circuits in odd-numbered rows and the $(2m)^{th}$ column are electrically connected to a $(4m)^{th}$ data line, where m is a positive integer.

In a possible embodiment of the present disclosure, the first multiplexing sub-circuit includes at least one first multiplexing transistor and at least one second multiplexing transistor. A control electrode of the first multiplexing transistor is electrically connected to the first multiplexing control terminal, a first electrode of the first multiplexing transistor is electrically connected to the $(4m-3)^{th}$ data line, and a second electrode of the first multiplexing transistor is electrically connected to the data driver. A control electrode of the second multiplexing transistor is electrically connected to the first multiplexing control terminal, a first electrode of the second multiplexing transistor is electrically connected to the $(4m)^{th}$ data line, and a second electrode of the second multiplexing transistor is electrically connected to the data driver.

In a possible embodiment of the present disclosure, the second multiplexing sub-circuit includes at least one third multiplexing transistor and at least one fourth multiplexing transistor. A control electrode of the third multiplexing transistor is electrically connected to the second multiplexing control terminal, a first electrode of the third multiplexing transistor is electrically connected to the $(4m-2)^{th}$ data line, and a second electrode of the third multiplexing transistor is electrically connected to the data driver. A control electrode of the fourth multiplexing transistor is electrically connected to the second multiplexing control terminal, a first electrode of the fourth multiplexing transistor is electrically connected to the $(4m-1)^{th}$ data line, and a second electrode of the fourth multiplexing transistor is electrically connected to the data driver.

In a possible embodiment of the present disclosure, the pixel circuits in even-numbered rows and a $(2m-1)^{th}$ column are electrically connected to a $(4m-3)^{th}$ data line, the pixel circuits in odd-numbered rows and the $(2m-1)^{th}$ column are electrically connected to a $(4m-2)^{th}$ data line, the pixel circuits in even-numbered rows and a $(2m)^{th}$ column are electrically connected to a $(4m-1)^{th}$ data line, the pixel circuits in odd-numbered rows and the $(2m)^{th}$ column are electrically connected to a $(4m)^{th}$ data line, where m is a positive integer.

In a possible embodiment of the present disclosure, the first multiplexing sub-circuit includes at least one first multiplexing transistor and at least one second multiplexing transistor. A control electrode of the first multiplexing transistor is electrically connected to the first multiplexing control terminal, a first electrode of the first multiplexing transistor is electrically connected to the $(4m-2)^{th}$ data line, and a second electrode of the first multiplexing transistor is electrically connected to the data driver. A control electrode of the second multiplexing transistor is electrically connected to the first multiplexing control terminal, a first electrode of the second multiplexing transistor is electrically connected to the $(4m-1)^{th}$ data line, and a second electrode of the second multiplexing transistor is electrically connected to the data driver.

In a possible embodiment of the present disclosure, the second multiplexing sub-circuit includes at least one third multiplexing transistor and at least one fourth multiplexing transistor. A control electrode of the third multiplexing transistor is electrically connected to the second multiplexing control terminal, a first electrode of the third multiplexing transistor is electrically connected to the $(4m-3)^{th}$ data line, and a second electrode of the third multiplexing transistor is electrically connected to the data driver. A control electrode of the fourth multiplexing transistor is electrically connected to the second multiplexing control terminal, a first electrode of the fourth multiplexing transistor is electrically connected to the $(4m)^{th}$ data line, and a second electrode of the fourth multiplexing transistor is electrically connected to the data driver.

In a possible embodiment of the present disclosure, the $n^{th}$-level shift register unit includes a first one of $n^{th}$-level shift register modules and a second one of $n^{th}$-level shift register modules, and the pixel circuits are arranged in an active display region. The first one of the $n^{th}$-level shift register modules is located at a first side of the active display region, and configured to apply the same gate driving signal to the pixel circuits in the $(2n-1)^{th}$ row and the $(2n)^{th}$ row. The second one of the $n^{th}$-level shift register modules is located at a second side of the active display region, and configured to apply the same gate driving signal to the pixel circuits in the $(2n-1)^{th}$ row and the $(2n)^{th}$ row.

In a possible embodiment of the present disclosure, the display drive module further includes a light-emitting control circuit, the light-emitting control circuit includes a plurality of levels of light-emitting control units; and an $n^{th}$-level light-emitting control unit is electrically connected to the pixel circuits in the $(2n-1)^{th}$ row and the $(2n)^{th}$ row, and configured to apply a same light-emitting control signal to the pixel circuits in the $(2n-1)^{th}$ row and the $(2n)^{th}$ row, where n is a positive integer.

In a possible embodiment of the present disclosure, the $n^{th}$-level shift register unit includes an $n^{th}$-level pull-up node control circuit, an $n^{th}$-level pull-down control node control circuit, an $n^{th}$-level pull-down node control circuit and an $n^{th}$-level gate driving signal output circuit. The $n^{th}$-level pull-up node control circuit is electrically connected to a first clock signal terminal, a first voltage terminal, an $n^{th}$-level pull-up node and an $n^{th}$-level pull-down control node, and configured to control the $n^{th}$-level pull-up node to be electrically connected to the first voltage terminal under the control of a first clock signal from the first clock signal terminal, and control the $n^{th}$-level pull-up node to be electrically connected to the first clock signal terminal and maintain a potential at the $n^{th}$-level pull-up node under the control of a potential at the $n^{th}$-level pull-down control node. The $n^{th}$-level pull-down control node control circuit is electrically connected to an input terminal, the first clock signal terminal, a second clock signal terminal, the $n^{th}$-level pull-up node, a second voltage terminal and the $n^{th}$-level pull-down control node, and configured to control the $n^{th}$-level pull-down control node to be electrically connected to the input terminal under the control of the first clock signal, control the $n^{th}$-level pull-down control node to be electrically connected to the second voltage terminal under the control of the potential at the $n^{th}$-level pull-up node and a second clock signal from the second clock signal terminal. The $n^{th}$-level pull-down node control circuit is electrically connected to the $n^{th}$-level pull-down control node, the first voltage terminal and the $n^{th}$-level pull-down node, and configured to control the $n^{th}$-level pull-down control node to be electrically connected to the $n^{th}$-level pull-down node and maintain a potential at the $n^{th}$-level pull-down node under the control of a first voltage signal from the first voltage terminal. The $n^{th}$-level gate driving signal output circuit is electrically connected to the $n^{th}$-level pull-up node, the $n^{th}$-level pull-down node, the second voltage terminal, the second clock signal terminal and an $n^{th}$-level gate driving signal output terminal, and configured to control the $n^{th}$-level gate driving signal output terminal to be electrically connected to the second voltage terminal under the control of the potential at the $n^{th}$-level pull-up node, and control the $n^{th}$-level gate driving signal output terminal to be electrically connected to the second clock signal terminal under the control of the potential at the $n^{th}$-level pull-down node. The $n^{th}$-level gate driving signal output terminal is electrically connected to the pixel circuits in the $(2n-1)^{th}$ row and the $(2n)^{th}$ row.

In a possible embodiment of the present disclosure, the $n^{th}$-level pull-up node control circuit includes a first scanning control transistor, a second scanning control transistor and a first scanning storage capacitor. A control electrode of the first scanning control transistor is electrically connected to the first clock signal terminal, a first electrode of the first scanning control transistor is electrically connected to the first voltage terminal, and a second electrode of the first scanning control transistor is electrically connected to the $n^{th}$-level pull-up node. A control electrode of the second scanning control transistor is electrically connected to the $n^{th}$-level pull-down control node, a first electrode of the second scanning control transistor is electrically connected to the $n^{th}$-level pull-up node, and a second electrode of the second scanning control transistor is electrically connected to the first clock signal terminal. A first terminal of the first scanning storage capacitor is electrically connected to the $n^{th}$-level pull-up node, and a second terminal of the first scanning storage capacitor is electrically connected to the second voltage terminal.

In a possible embodiment of the present disclosure, the $n^{th}$-level pull-down control node control circuit includes a third scanning control transistor, a fourth scanning control transistor and a fifth scanning control transistor. A control electrode of the third scanning control transistor is electrically connected to the first clock signal terminal, a first electrode of the third scanning control transistor is electrically connected to the input terminal, and a second electrode of the third scanning control transistor is electrically connected to the $n^{th}$-level pull-down control node. A control electrode of the fourth scanning control transistor is electrically connected to the $n^{th}$-level pull-up node, and a first electrode of the fourth scanning control transistor is electrically connected to the second voltage terminal. A control electrode of the fifth scanning control transistor is electrically connected to the second clock signal terminal, a first electrode of the fifth scanning control transistor is electrically connected to a second electrode of the fourth scanning control transistor, and a second electrode of the fifth scanning control transistor is electrically connected to the $n^{th}$-level pull-down control node.

In a possible embodiment of the present disclosure, the $n^{th}$-level pull-down node control circuit includes a sixth scanning control transistor and a second scanning storage capacitor. A control electrode of the sixth scanning control transistor is electrically connected to the first voltage terminal, a first electrode of the sixth scanning control transistor is electrically connected to the $n^{th}$-level pull-down control node, and a second electrode of the sixth scanning control transistor is electrically connected to the $n^{th}$-level pull-down node. A first terminal of the second scanning storage capacitor is electrically connected to the $n^{th}$-level pull-down node, and a second terminal of the second scanning storage capacitor is electrically connected to the $n^{th}$-level gate driving signal output terminal.

In a possible embodiment of the present disclosure, the $n^{th}$-level gate driving signal output circuit includes a seventh scanning control transistor and an eighth scanning control transistor. A control electrode of the seventh scanning control transistor is electrically connected to the $n^{th}$-level pull-up node, a first electrode of the seventh scanning control transistor is electrically connected to the second voltage terminal, and a second electrode of the seventh scanning control transistor is electrically connected to the $n^{th}$-level gate driving signal output terminal. A control electrode of the eighth scanning control transistor is electrically connected to the $n^{th}$-level pull-down node, a first electrode of the eighth scanning control transistor is electrically connected to the $n^{th}$-level gate driving signal output terminal, and a second electrode of the eighth scanning control transistor is electrically connected to the second clock signal terminal.

A method for driving the above-mentioned display driving module is further provided in the present disclosure, including: controlling, by the first multiplexing sub-circuit, the data driver to apply corresponding data voltages to the data lines electrically connected to the pixel circuits in odd-numbered rows and odd-numbered columns and the data lines electrically connected to the pixel circuits in even-numbered rows and even-numbered columns under the control of the first multiplexing control signal from the first multiplexing control terminal; controlling, by the second multiplexing sub-circuit, the data driver to apply corresponding data voltages to the data lines electrically connected to the pixel circuits in odd-numbered rows and even-numbered columns and the data lines electrically connected to the pixel circuits in even-numbered rows and odd-numbered columns under the control of the second multiplexing control signal from the second multiplexing control terminal. The $n^{th}$-level shift register unit applies the same gate driving signal to the pixel circuits in the $(2n-1)^{th}$ row and the $(2n)^{th}$ row, where n is a positive integer.

A display device including the above-mentioned display driving module is further provided in the present disclosure.

DETAILED DESCRIPTION

The technical solutions in the embodiments of the present disclosure will be described hereinafter clearly and completely with reference to the drawings of the embodiments of the present disclosure. Apparently, the following embodiments merely relate to a part of, rather than all of, the embodiments of the present disclosure, and based on these embodiments, a person of ordinary skill in the art may, without any creative effort, obtain other embodiments, which also fall within the scope of the present disclosure.

In the embodiments of the present disclosure, each transistor maybe a triode, a thin film transistor (TFT), a field effect transistor (FET), or any other element having a same characteristic. In order to differentiate two electrodes of the transistor, apart from a control electrode, from each other, one of the two electrodes may be called as a first electrode, and the other may be called as a second electrode.

In actual use, when the transistor is a triode, the control electrode may be a base, the first electrode may be a collector and the second electrode may be an emitter, or the control electrode may be a base, the first electrode may be an emitter and the second electrode may be a collector.

In actual use, when the transistor is a TFT or FET, the control electrode may be a gate electrode, the first electrode may be a drain electrode and the second electrode may be a source electrode, or the control electrode may be a gate electrode, the first electrode may be a source electrode and the second electrode may be a drain electrode.

A main objective of the present disclosure is to provide a display driving module, a method for driving the display driving module and a display device, so as to address an issue that crosstalk occurs for pixel circuits in a previous row when charging pixel circuits in a row in the related art, resulting in overall crosstalk occurring for pixel circuits in multiple rows in a display screen.

Specifically, in the embodiments of the present disclosure, the display driving module is applied to the display device, the display device includes pixel circuits in multiple rows and multiple columns, and the display driving module includes a gate driving circuit, a plurality of data lines each extending in a column direction and a data driving circuit.

The pixel circuits in odd-numbered rows and one column are electrically connected to a data line, and the pixel circuits in even-numbered rows and the one column are electrically connected to another data line.

Figure 1:
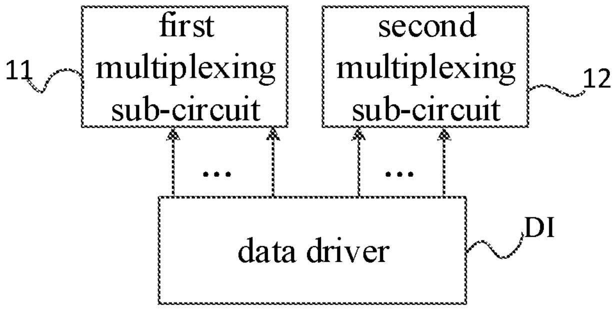
FIG. 1 is a structural diagram of a data driving circuit in a display driving module according to an embodiment of the present disclosure.

As shown in FIG. 1, the data driving circuit includes a data driver DI and a multiplexing circuit, and the multiplexing circuit includes a first multiplexing sub-circuit 11 and a second multiplexing sub-circuit 12.

Figure 2:
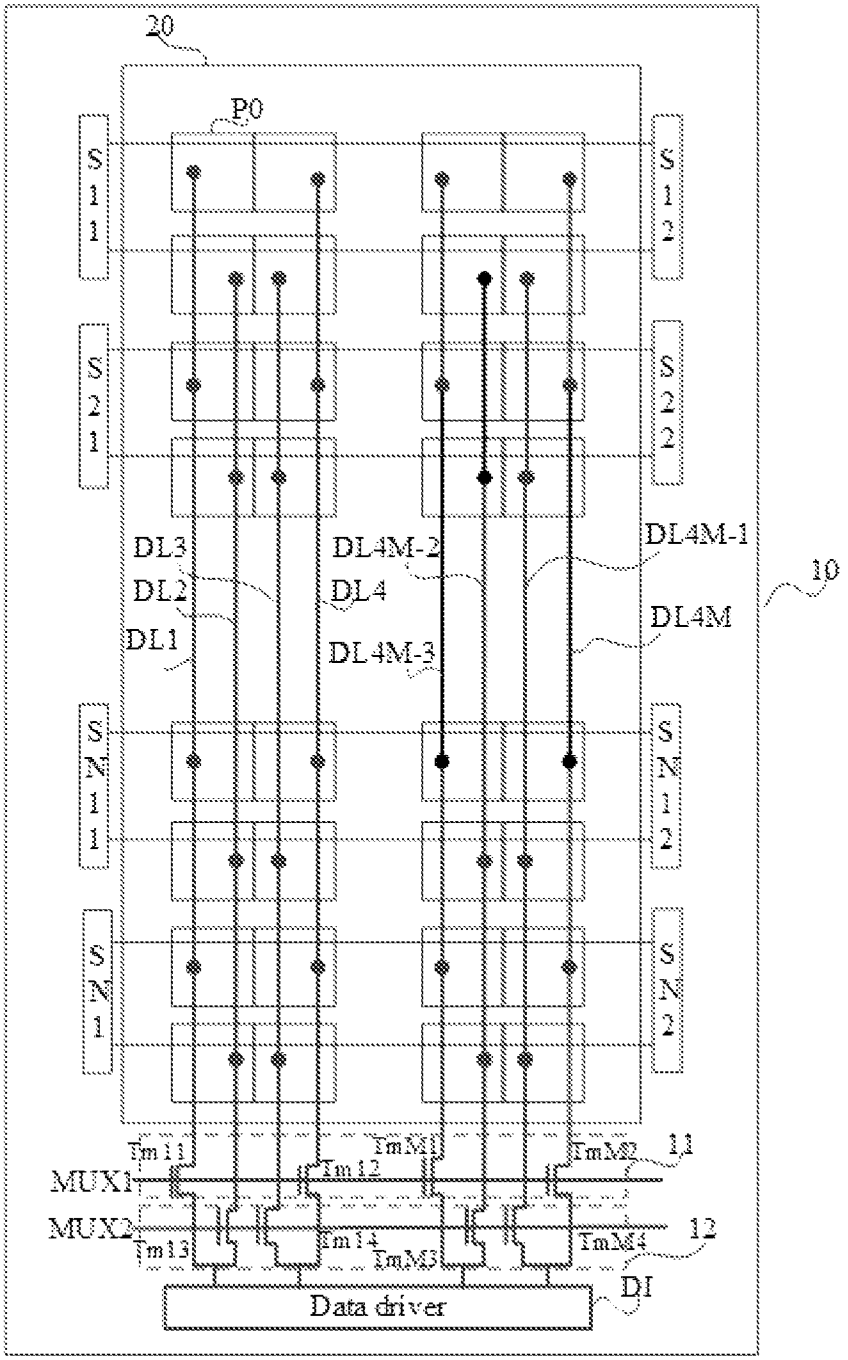
FIG. 2 is a schematic view showing a connection relationship between the display driving module and pixel circuits in multiple rows located in an active display region in a display device.

The first multiplexing sub-circuit 11 is electrically connected to a first multiplexing control terminal MUX1 (as shown in FIG. 2), the data driver DI, the data lines (not shown in FIG. 1) electrically connected to the pixel circuits in odd-numbered rows and odd-numbered columns and the data lines (not shown in FIG. 1) electrically connected to the pixel circuits in even-numbered rows and even-numbered columns. The first multiplexing sub-circuit 11 is configured to control the data driver DI to apply corresponding data voltages to the data lines electrically connected to the pixel circuits in odd-numbered rows and odd-numbered columns and the data lines electrically connected to the pixel circuits in even-numbered rows and even-numbered columns under the control of a first multiplexing control signal from the first multiplexing control terminal MUX1.

The second multiplexing sub-circuit 12 is electrically connected to a second multiplexing control terminal MUX2 (as shown in FIG. 2), the data driver DI, the data lines (not shown in FIG. 1) electrically connected to the pixel circuits in odd-numbered rows and even-numbered columns and the data lines (not shown in FIG. 1) electrically connected to the pixel circuits in even-numbered rows and odd-numbered columns. The second multiplexing sub-circuit 12 is configured to control the data driver DI to apply corresponding data voltages to the data lines electrically connected to the pixel circuits in odd-numbered rows and even-numbered columns and the data lines electrically connected to the pixel circuits in even-numbered rows and odd-numbered columns under the control of a second multiplexing control signal from the second multiplexing control terminal MUX2.

The gate driving circuit includes a plurality of levels of shift register units, an $n^{th}$-level shift register unit is electrically connected to the pixel circuits in a $(2n-1)^{th}$ row and a $(2n)^{th}$ row, and configured to apply a same gate driving signal to the pixel circuits in the $(2n-1)^{t}$ row and the $(2n)^{th}$ row, wherein n is a positive integer.

In the embodiments of the present disclosure, the shift register unit in the gate driving circuit is electrically connected to the pixel circuits in two rows, and configured to apply the same gate driving signal to the pixel circuits in two rows, so that charging times of the pixel circuits in two rows completely overlap. Further, the first multiplexing sub-circuit 11 is electrically connected to both the pixel circuits in odd-numbered rows and the pixel circuits in even-numbered rows, and the second multiplexing sub-circuit 12 is electrically connected to both the pixel circuits in odd-numbered rows and the pixel circuits in even-numbered rows, so it is able to prevent crosstalk from occurring for the pixel circuits in a previous row when charging pixel circuits in a row, and prevent overall crosstalk from occurring for pixel circuits in multiple rows in the display screen.

When the display driving module is in operation, during a switching time period between a time period that the MUX1 applies an active first multiplexing control signal and a time period that the MUX2 applies an active second multiplexing control signal, the shift register unit in the gate driving circuit does not apply an active gate driving signal, so it is able to avoid crosstalk caused by that, when a voltage on a data line jumps, it has a large influence on a potential at a node in the pixel circuit in the case that a data written-in transistor in a pixel circuit is turned on.

In the embodiments of the present disclosure, the active first multiplexing control signal is referred to as a first multiplexing control signal through which it is able for the first multiplexing sub-circuit 11 to control the data driver DI to apply the corresponding data voltages to the data lines electrically connected to the pixel circuits in odd-numbered rows and odd-numbered columns and the data lines electrically connected to the pixel circuits in even-numbered rows and even-numbered columns. The active second multiplexing control signal is referred to as a second multiplexing control signal through which it is able for the second multiplexing sub-circuit 12 to control the data driver to apply the corresponding data voltages to the data lines electrically connected to the pixel circuits in odd-numbered rows and even-numbered columns and the data lines electrically connected to the pixel circuits in even-numbered rows and odd-numbered columns. The active gate driving signal is referred to as a gate driving signal through which it is able to control the data written-in transistor to be turned on.

In the embodiments of the present disclosure, the pixel circuits are arranged in an active display region, and the $n^{th}$-level shift register unit may include a first one of $n^{th}$-level shift register modules located at a first side of the active display region, and a second one of $n^{th}$-level shift register modules located at a second side of the active display region; the first side is opposite to the second side.

For example, the first side may be, but not limited to, a left side and the second side may be, but not limited to, a right side.

In a possible embodiment of the present disclosure, when a size of the display device is large, the one-level shift register unit may include, but not limited to, two shift register modules applying the gate driving signal to the pixel circuits in one row simultaneously.

According to a specific embodiment, the display driving module may include the plurality of data lines. The pixel circuits in odd-numbered rows and a $(2m-1)^{th}$ column are electrically connected to a $(4m-3)^{th}$ data line, the pixel circuits in even-numbered rows and the $(2m-1)^{th}$ column are electrically connected to a $(4m-2)^{th}$ data line, the pixel circuits in even-numbered rows and a $(2m)^{th}$ column are electrically connected to a $(4m-1)^{th}$ data line, the pixel circuits in odd-numbered rows and the $(2m)^{th}$ column are electrically connected to a $(4m)^{th}$ data line, where m is a positive integer.

In the embodiments of the present disclosure, the first multiplexing sub-circuit 11 may be electrically connected to the $(4m-3)^{th}$ data line and the $(4m)^{th}$ data line, and the second multiplexing sub-circuit 12 may be electrically connected to the $(4m-2)^{th}$ data line and the $(4m-1)^{th}$ data line.

In the embodiments of the present disclosure, the first multiplexing sub-circuit may include at least one first multiplexing transistor and at least one second multiplexing transistor. A control electrode of the first multiplexing transistor is electrically connected to the first multiplexing control terminal, a first electrode of the first multiplexing transistor is electrically connected to the $(4m-3)^{th}$ data line, and a second electrode of the first multiplexing transistor is electrically connected to the data driver. A control electrode of the second multiplexing transistor is electrically connected to the first multiplexing control terminal, a first electrode of the second multiplexing transistor is electrically connected to the $(4m)^{th}$ data line, and a second electrode of the second multiplexing transistor is electrically connected to the data driver.

During the implementation, the first multiplexing transistor and the second multiplexing transistor are each an n-type transistor or a p-type transistor.

In the embodiments of the present disclosure, the second multiplexing sub-circuit may include at least one third multiplexing transistor and at least one fourth multiplexing transistor. A control electrode of the third multiplexing transistor is electrically connected to the second multiplexing control terminal, a first electrode of the third multiplexing transistor is electrically connected to the $(4m-2)^{th}$ data line, and a second electrode of the third multiplexing transistor is electrically connected to the data driver. A control electrode of the fourth multiplexing transistor is electrically connected to the second multiplexing control terminal, a first electrode of the fourth multiplexing transistor is electrically connected to the $(4m-1)^{th}$ data line, and a second electrode of the fourth multiplexing transistor is electrically connected to the data driver.

During the implementation, the third multiplexing transistor and the fourth multiplexing transistor are each an n-type transistor or a p-type transistor.

As shown in FIG. 2, the display device includes the display driving module and the pixel circuits in multiple rows located in the active display region 20. The display driving module includes the gate driving circuit, the plurality of data lines each extending in the column direction and the data driving circuit. The pixel circuits in odd-numbered rows and one column are electrically connected to a data line, and the pixel circuits in even-numbered rows and the one column are electrically connected to another data line. The data driving circuit includes the data driver (DI) and the multiplexing circuit, and the multiplexing circuit includes the first multiplexing sub-circuit 11 and the second multiplexing sub-circuit 12.

In FIG. 2, pixel circuits in a first row, a second row, a third row, a fourth row, a $(2N-3)^{th}$ row, a $(2N-2)^{th}$ row, a $(2N-1)^{th}$ row and a $(2N)^{th}$ row located in the active display region 20 are shown (in FIG. 2, the pixel circuits in the first row, the second row, the third row, the fourth row, the $(2N-3)^{th}$ row, the $(2N-2)^{th}$ row, the $(2N-1)^{th}$ row and the $(2N)^{th}$ row are arranged sequentially along a direction from top to bottom), where N is an integer greater than 3.

In FIG. 2, P0 represents a pixel circuit.

FIG. 2 shows a first one S11 of first-level shift register modules and a second one S12 of the first-level shift register modules in a first level shift register unit, a first one S21 of second-level shift register modules and a second one S22 of the second-level shift register modules in a second-level shift register unit, a first one SN11 of $(N-1)^{th}$-level shift register modules and a second one SN12 of the $(N-1)^{th}$-level shift register modules in a $(N-1)^{th}$-level shift register unit, a first one SN1 of $N^{th}$-level shift register modules and a second one SN2 of the $N^{th}$-level shift register modules in an $N^{th}$-level shift register unit of the gate driving circuit.

S11, S21, SN11 and SN1 are all arranged on the first side, such as the left side, of the active display region 20, and S12, S22, SN12 and SN2 are all arranged on the second side, such as the right side, of the active display region 20.

S11 and S12 each applies a first gate driving signal, and S21 and S22 each applies a second gate driving signal. SN11 and SN12 each applies an $(N-1)^{th}$ gate driving signal, and SN1 and SN2 each applies an $(N)^{th}$ gate driving signal.

Both S11 and S12 are electrically connected to the pixel circuits in the first row and the second row, and apply the first gate driving signal to the pixel circuits in the first row and the second row.

Both S21 and S22 are electrically connected to the pixel circuits in the third row and the fourth row, and apply the second gate driving signal to the pixel circuits in the third row and the fourth row.

Both SN11 and SN12 are electrically connected to the pixel circuits in the $(2N-3)^{th}$ row and the $(2N-2)^{th}$ row, and apply the $(N-1)^{th}$ gate driving signal to the pixel circuits in the $(2N-3)^{th}$ row and the $(2N-2)^{th}$ row.

Both SN1 and SN2 are electrically connected to the pixel circuits in the $(2N-1)^{th}$ row and the $(2N)^{th}$ row, and apply the $N^{th}$ gate driving signal to the pixel circuits in the $(2N-1)^{th}$ row and the $(2N)^{th}$ row.

As shown in FIG. 2, the pixel circuits in each column are electrically connected to two data lines. A first data line DL1 is electrically connected to the pixel circuits in odd-numbered rows and a first column, and a second data line DL2 is electrically connected to the pixel circuits in even-numbered rows and the first column. A third data line DL3 is electrically connected to the pixel circuits in even-numbered rows and a second column, and a fourth data line DL4 is electrically connected to the pixel circuits in odd-numbered rows and the second column. A $(4M-3)^{th}$ data line DL4M−3 is electrically connected to the pixel circuits in odd-numbered rows and a $(2M-1)^{th}$ column, and a $(4M-2)^{th}$ data line DL4M−2 is electrically connected to the pixel circuits in even-numbered rows and the $(2M-1)^{th}$ column. A $(4M-1)^{th}$ data line DL4M−1 is electrically connected to the pixel circuits in even-numbered rows and a $(2M)^{th}$ column, and a $(4M)^{th}$ data line DL4M is electrically connected to the pixel circuits in odd-numbered rows and the $(2M)^{th}$ column. M is an integer greater than 1.

FIG. 2 shows that the first multiplexing sub-circuit 11 includes a first one Tm11 of first multiplexing transistors, a first one Tm12 of second multiplexing transistors, an $M^{th}$ one TmM1 of the first multiplexing transistors and an $M^{th}$ one TmM2 of the second multiplexing transistors. A gate electrode of the Tm11 is electrically connected to the first multiplexing control terminal MUX1, a drain electrode of the Tm11 is electrically connected to the DL1, and a source electrode of the Tm11 is electrically connected to the data driver DI. A gate electrode of the Tm12 is electrically connected to the first multiplexing control terminal MUX1, a drain electrode of the Tm12 is electrically connected to the DL4, and a source electrode of the Tm12 is electrically connected to the data driver DI. A gate electrode of the TmM1 is electrically connected to the first multiplexing control terminal MUX1, a drain electrode of the TmM1 is electrically connected to the DL4M−3, and a source electrode of the TmM1 is electrically connected to the data driver DI. A gate electrode of the TmM2 is electrically connected to the first multiplexing control terminal MUX1, a drain electrode of TmM2 is electrically connected to DL4M, and a source electrode of the TmM2 is electrically connected to the data driver DI.

FIG. 2 shows that the second multiplexing sub-circuit 12 includes a first one Tm13 of third multiplexing transistors, a first one Tm14 of fourth multiplexing transistors, an $M^{th}$ one TmM3 of the third multiplexing transistors and an $M^{th}$ one TmM4 of the fourth multiplexing transistors. A gate electrode of the Tm13 is electrically connected to the second multiplexing control terminal MUX2, a drain electrode of the Tm13 is electrically connected to the DL2, and a source electrode of the Tm13 is electrically connected to the data driver DI. A gate electrode of the Tm14 is electrically connected to the second multiplexing control terminal MUX2, a drain electrode of the Tm14 is electrically connected to the DL3, and a source electrode of the Tm14 is electrically connected to the data driver DI. A gate electrode of the TmM3 is electrically connected to the second multiplexing control terminal MUX2, a drain electrode of the TmM3 is electrically connected to the DL4m−2, and a source electrode of the TmM3 is electrically connected to the data driver DI. A gate electrode of the TmM4 is electrically connected to the second multiplexing control terminal MUX2, a drain electrode of TmM4 is electrically connected to DL4m−1, and a source electrode of the TmM4 is electrically connected to the data driver DI.

In FIG. 2, all multiplexing transistors are, but not limited to, p-type thin film transistors.

In FIG. 2, 10 denotes a display substrate in the display device, and the pixel circuits and the display driving module may be arranged on the display substrate 10.

As shown in FIG. 2, each data line extracted from the data driver DI longitudinally passes through corresponding pixel circuits, and the pixel circuits in each column is controlled to emit light by two data lines. A gate line electrically connected to the gate driving circuit and a light-emitting control line electrically connected to the light-emitting control circuit pass through the pixel circuits in a corresponding row.

Figure 3:
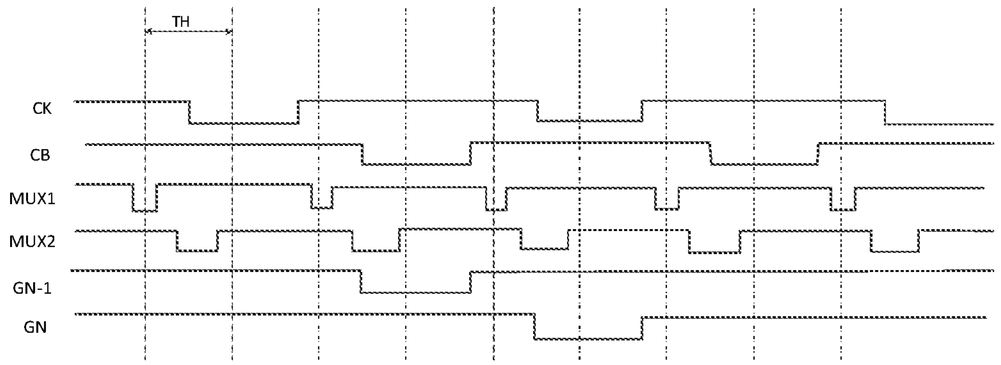
FIG. 3 is an operation sequence diagram of the display device according to an embodiment of the present disclosure.

As shown in FIG. 3, when the display driving module in FIG. 2 is in operation, the MUX1 applies a low voltage signal, each multiplexing transistor in the first multiplexing sub-circuit 11 is controlled to be turned on, so that the DI applies the corresponding data voltages to the pixel circuits in odd-numbered rows and odd-numbered columns and the pixel circuits in odd-numbered rows and even-numbered columns. Next, the MUX 2 applies a low voltage signal, each multiplexing transistor in the second multiplexing sub-circuit 12 is controlled to be turned on, so that the DI applies the corresponding data voltages to the pixel circuits in even-numbered rows and odd-numbered columns and the pixel circuits in even-numbered rows and even-numbered columns.

After the MUX2 applies the low voltage signal, the $(N-1)^{th}$ gate driving signal (GN−1) applied to the pixel circuits in the $(2N-3)^{th}$ row and the pixel circuits in the $(2N-2)^{th}$ row by the SN11 and the SN12 is a low voltage signal, so as to enable data written-in transistors of the pixel circuits in the $(2N-3)^{th}$ row and the $(2N-2)^{th}$ row to be turned on, thereby to charge the corresponding pixel circuits via the corresponding data lines respectively.

After the GN−1 is restored to a high voltage signal, the MUX1 applies a low voltage signal, each multiplexing transistor in the first multiplexing sub-circuit 11 is controlled to be turned on, so that the DI applies the corresponding data voltages to the pixel circuits in odd-numbered rows and odd-numbered columns and the pixel circuits in odd-numbered rows and even-numbered columns. Next, the MUX 2 applies a low voltage signal, each multiplexing transistor in the second multiplexing sub-circuit 12 is controlled to be turned on, so that the DI applies the corresponding data voltages to the pixel circuits in even-numbered rows and odd-numbered columns and the pixel circuits in even-numbered rows and even-numbered columns.

After the MUX2 applies the low voltage signal, the $N^{th}$ gate driving signal GN applied to the pixel circuits in the $(2N-1)^{th}$ row and the $(2N)^{th}$ row is a low voltage signal, so as to enable data written-in transistors of the pixel circuits in the $(2N-1)^{th}$ row and the $(2N)^{th}$ row to be turned on, thereby to charge the corresponding pixel circuits via the corresponding column data lines respectively.

As shown in FIG. 3, the time for charging the pixel circuits in each row is greater than TH, it is sufficient to perform charging in the case of high frequency frames, and eliminate crosstalk for data in adjacent rows. TH is a display time of the pixel circuits in one row. For example, when there are pixel circuits in 2N rows in a display device and a screen refresh rate is 120 Hz, TH is equal to ½N/120.

Figure 4:
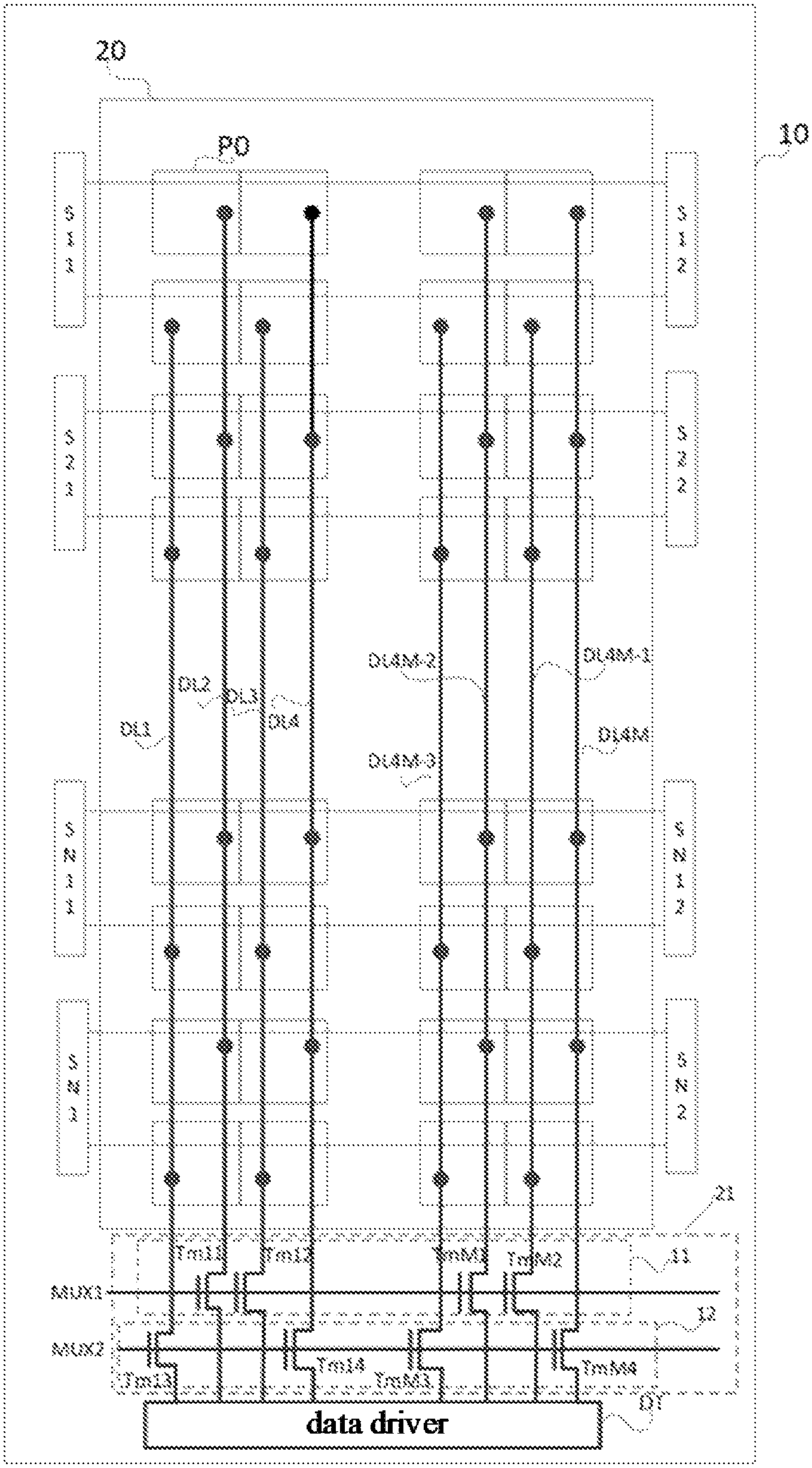
FIG. 4 is another schematic view showing the connection relationship between the display driving module and the pixel circuits in multiple rows located in the active display region in the display device.

For the sake of simplicity, some direct current signal lines, including a first driving voltage signal ELVDD and a second driving voltage signal ELVSS and an initial voltage signal of an Organic Light Emitting Diode (OLED), in the display device are not shown in FIGS. 2 and 4, and distributed over each pixel circuit.

In FIG. 3, CK denotes the first clock signal terminal, CB denotes the second clock signal terminal, and CK and CB apply clock signals to each level of the shift register unit.

As shown in FIG. 3, when the display driving module is in operation, during a time period between a time period that the MUX1 applies a low level and a time period that the MUX2 applies a low level, each level shift register unit in the gate driving circuit does not output a low voltage signal, so it is able to control a data written-in transistor in a pixel circuit not to be turned on when a voltage on a data line jumps, thereby to prevent a display from being adversely affected by a change in the voltage on the data line, and avoid crosstalk.

According to another specific embodiment, the display driving module may include the plurality of data lines, the pixel circuits in even-numbered rows and a $(2m-1)^{th}$ column are electrically connected to a $(4m-3)^{th}$ data line, the pixel circuits in odd-numbered rows and the $(2m-1)^{th}$ column are electrically connected to a $(4m-2)^{th}$ data line, the pixel circuits in even-numbered rows and a $(2m)^{th}$ column are electrically connected to a $(4m-1)^{th}$ data line, the pixel circuits in odd-numbered rows and the $(2m)^{th}$ column are electrically connected to a $(4m)^{th}$ data line, where m is a positive integer.

In the embodiments of the present disclosure, the first multiplexing sub-circuit 11 may be electrically connected to the $(4m-2)^{th}$ data line and the $(4m-1)^{th}$ data line, and the second multiplexing sub-circuit 12 may be electrically connected to the $(4m-3)^{th}$ data line and the $(4m)^{th}$ data line.

In a possible embodiment of the present disclosure, the second multiplexing sub-circuit may include at least one third multiplexing transistor and at least one fourth multiplexing transistor. A control electrode of the first multiplexing transistor is electrically connected to the first multiplexing control terminal, a first electrode of the first multiplexing transistor is electrically connected to the $(4m-2)^{th}$ data line, and a second electrode of the first multiplexing transistor is electrically connected to the data driver. A control electrode of the second multiplexing transistor is electrically connected to the first multiplexing control terminal, a first electrode of the second multiplexing transistor is electrically connected to the $(4m-1)^{th}$ data line, and a second electrode of the second multiplexing transistor is electrically connected to the data driver.

During the implementations, the first multiplexing transistor and the second multiplexing transistor are each an n-type transistor or a p-type transistor.

In a possible embodiment of the present disclosure, the second multiplexing sub-circuit may include at least at least one third multiplexing transistor and at least one fourth multiplexing transistor. A control electrode of the third multiplexing transistor is electrically connected to the second multiplexing control terminal, a first electrode of the third multiplexing transistor is electrically connected to the $(4m-3)^{th}$ data line, and a second electrode of the third multiplexing transistor is electrically connected to the data driver. A control electrode of the fourth multiplexing transistor is electrically connected to the second multiplexing control terminal, a first electrode of the fourth multiplexing transistor is electrically connected to the $(4m)^{th}$ data line, and a second electrode of the fourth multiplexing transistor is electrically connected to the data driver.

In specific implementations, the first multiplexing transistor and the second multiplexing transistor are each an n-type transistor or a p-type transistor.

As shown in FIG. 4, the display device includes the display driving module and the pixel circuits in multiple rows located in the active display region 20.

The display driving module includes the gate driving circuit, the plurality of data lines each extending in the column direction and the data driving circuit. The pixel circuits in odd-numbered rows and one column are electrically connected to a data line, and the pixel circuits in even-numbered rows and the one column are electrically connected to another data line. The data driving circuit includes the data driver DI and the multiplexing circuit 21, and the multiplexing circuit 21 includes the first multiplexing sub-circuit 11 and the second multiplexing sub-circuit 12.

In FIG. 4, pixel circuits in a first row, a second row, a third row, a fourth row, a $(2N-3)^{th}$ row, a $(2N-2)^{th}$ row, a $(2N-1)^{th}$ row and a $(2N)^{th}$ row located in the active display region 20 are shown (in FIG. 4, the pixel circuits in the first row, the second row, the third row, the fourth row, the $(2N-3)^{th}$ row, the $(2N-2)^{th}$ row, the $(2N-1)^{th}$ row and the $(2N)^{th}$ row are arranged sequentially along a direction from top to bottom), where N is an integer greater than 3.

In FIG. 4, P0 represents a pixel circuit

FIG. 4 shows a first one S11 of first-level shift register modules and a second one S12 of the first-level shift register modules in a first level shift register unit, a first one S21 of second-level shift register modules and a second one S22 of the second-level shift register modules in a second-level shift register unit, a first one SN11 of $(N-1)^{th}$-level shift register modules and a second one SN12 of the $(N-1)^{th}$-level shift register modules in a $(N-1)^{th}$-level shift register unit, a first one SN1 of $N^{th}$-level shift register modules and a second one SN2 of the $N^{th}$-level shift register modules in an $N^{th}$-level shift register unit of the gate driving circuit.

S11, S21, SN11 and SN1 are all arranged on the first side, such as the left side, of the active display region 20, and S12, S22, SN12 and SN2 are all arranged on the second side, such as the right side, of the active display region 20.

S11 and S12 each applies a first gate driving signal, and S21 and S22 each applies a second gate driving signal.

SN11 and SN12 each applies an $(N-1)^{th}$ gate driving signal, and SN1 and SN2 each applies an $(N)^{th}$ gate driving signal.

Both S11 and S12 are electrically connected to the pixel circuits in the first row and the second row, and apply the first gate driving signal to the pixel circuits in the first row and the second row.

Both S21 and S22 are electrically connected to the pixel circuits in the third row and the fourth row, and apply the second gate driving signal to the pixel circuits in the third row and the fourth row.

Both SN11 and SN12 are electrically connected to the pixel circuits in the $(2N-3)^{th}$ row and the $(2N-2)^{th}$ row, and apply the $(N-1)^{th}$ gate driving signal to the pixel circuits in the $(2N-3)^{th}$ row and the $(2N-2)^{th}$ row.

Both SN1 and SN2 are electrically connected to the pixel circuits in the $(2N-1)^{th}$ row and the $(2N)^{th}$ row, and apply the $N^{th}$ gate driving signal to the pixel circuits in the $(2N-1)^{th}$ row and the $(2N)^{th}$ row.

As shown in FIG. 4, the pixel circuits in each column are electrically connected to two data lines. A first data line DL1 is electrically connected to the pixel circuits in even-numbered rows and a first column, and a second data line DL2 is electrically connected to the pixel circuits in odd-numbered rows and the first column.

A third data line DL3 is electrically connected to the pixel circuits in even-numbered rows and a second column, and a fourth data line DL4 is electrically connected to the pixel circuits in odd-numbered rows and the second column. A $(4M-3)^{th}$ data line DL4M−3 is electrically connected to the pixel circuits in even-numbered rows and a $(2M-1)^{th}$ column, and a $(4M-2)^{th}$ data line DL4M−2 is electrically connected to the pixel circuits in odd-numbered rows and the $(2M-1)^{th}$ column. A $(4M-1)^{th}$ data line DL4M−1 is electrically connected to the pixel circuits in even-numbered rows and a $(2M)^{th}$ column, and a $(4M)^{th}$ data line DL4M is electrically connected to the pixel circuits in odd-numbered rows and the $(2M)^{th}$ column. M is an integer greater than 1.

FIG. 4 shows that the first multiplexing sub-circuit 11 includes a first one Tm11 of first multiplexing transistors, a first one Tm12 of second multiplexing transistors, an $M^{th}$ one TmM1 of the first multiplexing transistors and an $M^{th}$ one TmM2 of the second multiplexing transistors.

A gate electrode of the Tm11 is electrically connected to the first multiplexing control terminal MUX1, a drain electrode of the Tm11 is electrically connected to the DL2, and a source electrode of the Tm11 is electrically connected to the data driver DI. A gate electrode of the Tm12 is electrically connected to the first multiplexing control terminal MUX1, a drain electrode of the Tm12 is electrically connected to the DL3, and a source electrode of the Tm12 is electrically connected to the data driver DI. A gate electrode of the TmM1 is electrically connected to the first multiplexing control terminal MUX1, a drain electrode of the TmM1 is electrically connected to the DL4M−2, and a source electrode of the TmM1 is electrically connected to the data driver DI. A gate electrode of the TmM2 is electrically connected to the first multiplexing control terminal MUX1, a drain electrode of TmM2 is electrically connected to DL4M−1, and a source electrode of the TmM2 is electrically connected to the data driver DI.

FIG. 4 shows that the second multiplexing sub-circuit 12 includes a first one Tm13 of third multiplexing transistors, a first one Tm14 of fourth multiplexing transistors, an $M^{th}$ one TmM3 of the third multiplexing transistors and an $M^{th}$ one TmM4 of the fourth multiplexing transistors.

A gate electrode of the Tm13 is electrically connected to the second multiplexing control terminal MUX2, a drain electrode of the Tm13 is electrically connected to the DL1, and a source electrode of the Tm13 is electrically connected to the data driver DI. A gate electrode of the Tm14 is electrically connected to the second multiplexing control terminal MUX2, a drain electrode of the Tm14 is electrically connected to the DL4, and a source electrode of the Tm14 is electrically connected to the data driver DI. A gate electrode of the TmM3 is electrically connected to the second multiplexing control terminal MUX2, a drain electrode of the TmM3 is electrically connected to the DL4m−3, and a source electrode of the TmM3 is electrically connected to the data driver DI. A gate electrode of the TmM4 is electrically connected to the second multiplexing control terminal MUX2, a drain electrode of TmM4 is electrically connected to DL4m, and a source electrode of the TmM4 is electrically connected to the data driver DI.

In FIG. 4, all multiplexing transistors are, but not limited to, p-type thin film transistors.

In FIG. 4, 10 denotes a display substrate included in a display device, and the pixel circuits and the display driving module may be arranged on the display substrate 10.

As shown in FIG. 3, when the display driving module in FIG. 4 is in operation, the MUX1 applies a low voltage signal, each multiplexing transistor in the first multiplexing sub-circuit 11 is controlled to be turned on, so that the DI applies the corresponding data voltages to the pixel circuits in odd-numbered rows and odd-numbered columns and the pixel circuits in even-numbered rows and even-numbered columns. Next, the MUX2 applies a low voltage signal, each multiplexing transistor in the second multiplexing sub-circuit 12 is controlled to be turned on, so that the DI applies the corresponding data voltages to the pixel circuits in odd-numbered rows and even-numbered columns and the pixel circuits in even-numbered rows and odd-numbered columns.

After the MUX2 applies the low voltage signal, the $(N-1)^{th}$ gate driving signal (GN−1) applied to the pixel circuits in the $(2N-3)^{th}$ row and the $(2N-2)^{th}$ row by the SN11 and the SN12 is a low voltage signal, so as to enable data written-in transistors of the pixel circuits in the $(2N-3)^{th}$ row and the $(2N-2)^{th}$ row to be turned on, thereby to charge the corresponding pixel circuits via the corresponding data lines respectively.

After the GN−1 is restored to a high voltage signal, the MUX1 applies a low voltage signal, each multiplexing transistor in the first multiplexing sub-circuit 11 is controlled to be turned on, so that the DI applies the corresponding data voltages to the pixel circuits in odd-numbered rows and odd-numbered columns and the pixel circuits in even-numbered rows and even-numbered columns. Next, the MUX2 applies a low voltage signal, each multiplexing transistor in the second multiplexing sub-circuit 12 is controlled to be turned on, so that the DI applies the corresponding data voltages to the pixel circuits in odd-numbered rows and even-numbered columns and the pixel circuits in even-numbered rows and odd-numbered columns.

After the MUX2 applies the low voltage signal, the $N^{th}$ gate driving signal GN applied to the pixel circuits in the $(2N-1)^{th}$ row and the $(2N)^{th}$ row is a low voltage signal, so as to enable data written-in transistors of the pixel circuits in the $(2N-1)^{th}$ row and the $(2N)^{th}$ row to be turned on, thereby to charge the corresponding pixel circuits via the corresponding column data lines respectively.

During the implementation, the display driving module may further include a light-emitting control circuit, the light-emitting control circuit includes a plurality of levels of light-emitting control units, and an $n^{th}$-level light-emitting control unit is electrically connected to the pixel circuits in the $(2n-1)^{th}$ row and the $(2n)^{th}$ row, and configured to apply a same light-emitting control signal to the pixel circuits in the $(2n-1)^{th}$ row and the $(2n)^{th}$ row, where n is a positive integer.

In the embodiments of the present disclosure, the display driving module may further include the light-emitting control circuit, and the light-emitting control units in the light-emitting control circuit apply the same light-emitting control signal to the pixel circuits in two adjacent rows.

During the implementation, the $n^{th}$-level light-emitting control unit may include a first one of $n^{th}$-level light-emitting control modules and a second one of the $n^{th}$-level light-emitting control modules, the first one of the $n^{th}$-level light-emitting control modules is arranged on the first side, such as the left side, of the active display region, the second one of the $n^{th}$-level light-emitting control modules is arranged on the second side, such as the right side, of the active display region, and the first one of the $n^{th}$-level light-emitting control modules and the second one of the $n^{th}$-level light-emitting control modules apply light-emitting control signals to the pixel circuits in the $(2n-1)^{th}$ row and the $(2n)^{th}$ row simultaneously.

Figure 5:
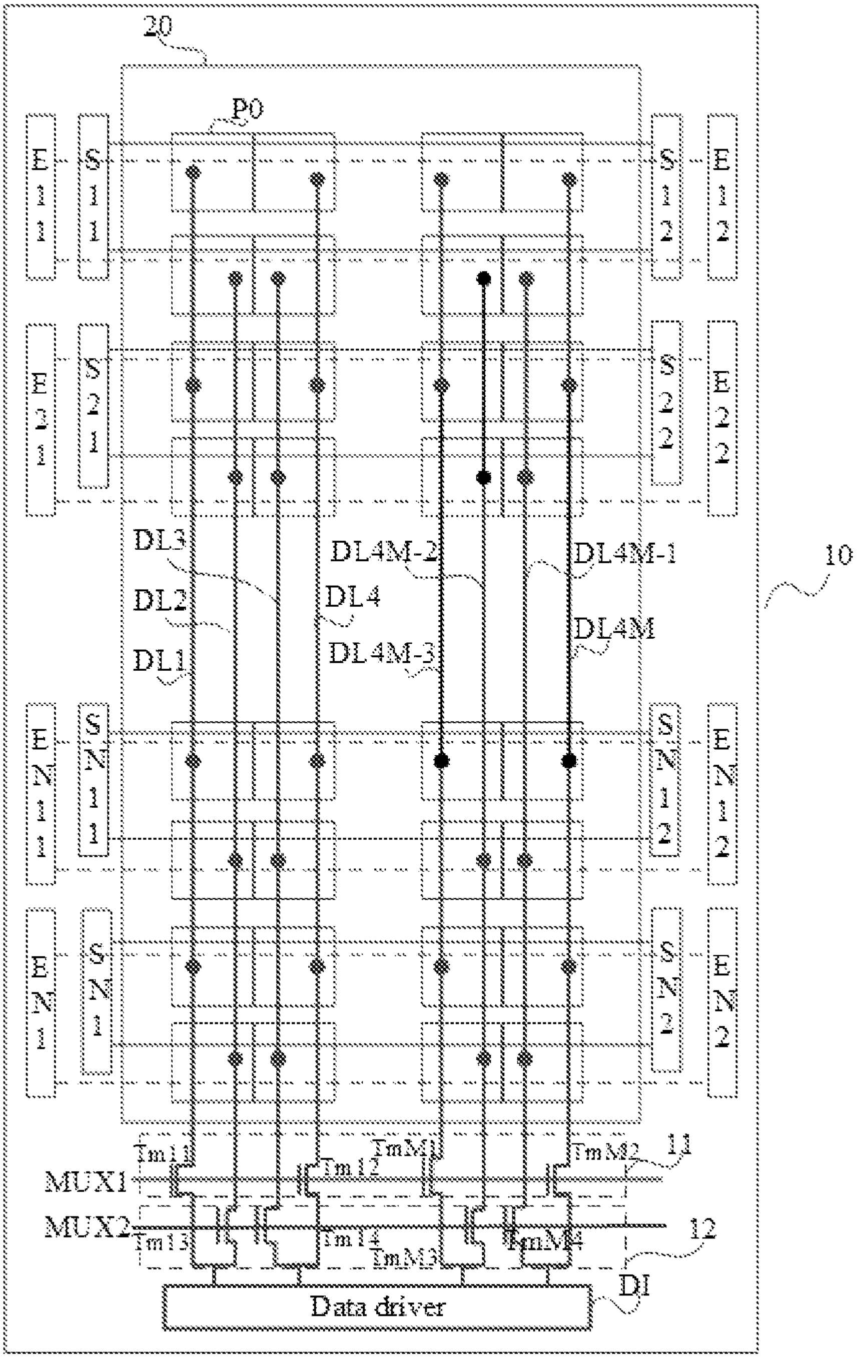
FIG. 5 is a schematic view showing the display device into which a light-emitting control circuit is added on the basis of the display device in FIG. 2.

As shown in FIG. 5, a first one E11 and a second one E12 of first-level light-emitting control modules in a first-level shift register unit, a first one E21 and a second one E22 of second-level light-emitting control modules in a second level shift register unit, a first one EN11 and a second one EN12 of $(N-1)^{th}$-level light-emitting control modules in an $(N-1)^{th}$-level shift register unit, and a first one EN1 and a second one EN2 of $N^{th}$-level light-emitting control modules in an $N^{th}$-level shift register unit in the light-emitting control circuit are added on the basis of the display device in FIG. 2.

E11 is electrically connected to the pixel circuits in the first row and the second row, and E12 is electrically connected to the pixel circuits in the first row and the second row.

E21 is electrically connected to the pixel circuits in the third row and the fourth row, and E22 is electrically connected to the pixel circuits in the third row and the fourth row.

EN11 is electrically connected to the pixel circuits in the $(2N-3)^{th}$ row and the $(2N-2)^{th}$ row, and EN12 is electrically connected to the pixel circuits in the $(2N-3)^{th}$ row and the $(2N-2)^{th}$ row.

EN1 is electrically connected to the pixel circuits in the $(2N-1)^{th}$ row and the $(2N)^{th}$ row, and EN2 is electrically connected to the pixel circuits in the $(2N-1)^{th}$ row and the $(2N)^{th}$ row.

Figure 6:
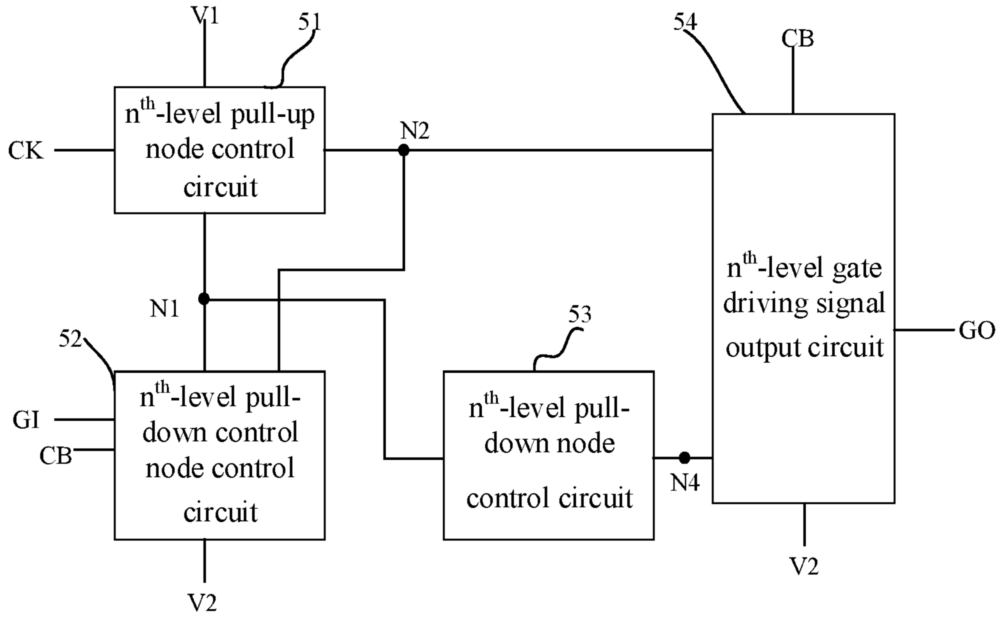
FIG. 6 is a structural diagram of an $n^{th}$-level shift register unit.

In the embodiments of the present disclosure, as shown in FIG. 6, the $n^{th}$-level shift register unit may include an $n^{th}$-level pull-up node control circuit 51, an $n^{th}$-level pull-down control node control circuit 52, an $n^{th}$-level pull-down node control circuit 53 and an $n^{th}$-level gate driving signal output circuit 54.

The $n^{th}$-level pull-up node control circuit 51 is electrically connected to a first clock signal terminal CK, a first voltage terminal V1, an $n^{th}$-level pull-up node N2 and an $n^{th}$-level pull-down control node N1, and configured to control the $n^{th}$-level pull-up node N2 to be electrically connected to the first voltage terminal V1 under the control of a first clock signal from the first clock signal terminal CK, and control the $n^{th}$-level pull-up node N2 to be electrically connected to the first clock signal terminal CK and maintain a potential at the $n^{th}$-level pull-up node N2 under the control of a potential at the $n^{th}$-level pull-down control node N1.

The $n^{th}$-level pull-down control node control circuit 52 is electrically connected to an input terminal GI, the first clock signal terminal CK, a second clock signal terminal CB, the $n^{th}$-level pull-up node N2, a second voltage terminal V2 and the $n^{th}$-level pull-down control node N1, and configured to control the $n^{th}$-level pull-down control node N1 to be electrically connected to the input terminal GI under the control of the first clock signal, control the $n^{th}$-level pull-down control node N1 to be electrically connected to the second voltage terminal V2 under the control of the potential at the $n^{th}$-level pull-up node N2 and a second clock signal from the second clock signal terminal CB.

The $n^{th}$-level pull-down node control circuit 53 is electrically connected to the $n^{th}$-level pull-down control node N1, the first voltage terminal V1 and the $n^{th}$-level pull-down node N4, and configured to control the $n^{th}$-level pull-down control node N1 to be electrically connected to the $n^{th}$-level pull-down node N4 and maintain a potential at the $n^{th}$-level pull-down node N4 under the control of a first voltage signal from the first voltage terminal V1.

The $n^{th}$-level gate driving signal output circuit 54 is electrically connected to the $n^{th}$-level pull-up node N2, the $n^{th}$-level pull-down node N4, the second voltage terminal V2, the second clock signal terminal CB and an $n^{th}$-level gate driving signal output terminal GO, and configured to control the $n^{th}$-level gate driving signal output terminal GO to be electrically connected to the second voltage terminal V2 under the control of the potential at the $n^{th}$-level pull-up node N2, and control the $n^{th}$-level gate driving signal output terminal GO to be electrically connected to the second clock signal terminal CB under the control of the potential at the $n^{th}$-level pull-down node N4.

The $n^{th}$-level gate driving signal output terminal GO is electrically connected to the pixel circuits (not shown in FIG. 6) in the $(2n-1)^{th}$ row and the $(2n)^{th}$ row.

When the $n^{th}$-level shift register unit in FIG. 6 is in operation, the $n^{th}$-level pull-up node control circuit 51 controls the potential at the $n^{th}$-level pull-up node N2, the $n^{th}$-level pull-down control node control circuit 52 controls the potential at the $n^{th}$-level pull-down control node N1, the $n^{th}$-level pull-down node control circuit 53 controls the potential at the $n^{th}$-level pull-down node, and the $n^{th}$-level gate driving signal output circuit 54 is configured to control the $n^{th}$-level gate driving signal output terminal GO to output an $n^{th}$-level gate driving signal.

In a possible embodiment of the present disclosure, the $n^{th}$-level pull-up node control circuit may include a first scanning control transistor, a second scanning control transistor and a first scanning storage capacitor. A control electrode of the first scanning control transistor is electrically connected to the first clock signal terminal, a first electrode of the first scanning control transistor is electrically connected to the first voltage terminal, and a second electrode of the first scanning control transistor is electrically connected to the $n^{th}$-level pull-up node. A control electrode of the second scanning control transistor is electrically connected to the $n^{th}$-level pull-down control node, a first electrode of the second scanning control transistor is electrically connected to the $n^{th}$-level pull-up node, and a second electrode of the second scanning control transistor is electrically connected to the first clock signal terminal. A first terminal of the first scanning storage capacitor is electrically connected to the $n^{th}$-level pull-up node, and a second terminal of the first scanning storage capacitor is electrically connected to the second voltage terminal.

In a possible embodiment of the present disclosure, the $n^{th}$-level pull-down control node control circuit may include a third scanning control transistor, a fourth scanning control transistor and a fifth scanning control transistor. A control electrode of the third scanning control transistor is electrically connected to the first clock signal terminal, a first electrode of the third scanning control transistor is electrically connected to the input terminal, and a second electrode of the third scanning control transistor is electrically connected to the $n^{th}$-level pull-down control node. A control electrode of the fourth scanning control transistor is electrically connected to the $n^{th}$-level pull-up node, and a first electrode of the fourth scanning control transistor is electrically connected to the second voltage terminal. A control electrode of the fifth scanning control transistor is electrically connected to the second clock signal terminal, a first electrode of the fifth scanning control transistor is electrically connected to a second electrode of the fourth scanning control transistor, and a second electrode of the fifth scanning control transistor is electrically connected to the $n^{th}$-level pull-down control node.

In the embodiments of the present disclosure, the $n^{th}$-level pull-down node control circuit may include a sixth scanning control transistor and a second scanning storage capacitor. A control electrode of the sixth scanning control transistor is electrically connected to the first voltage terminal, a first electrode of the sixth scanning control transistor is electrically connected to the $n^{th}$-level pull-down control node, and a second electrode of the sixth scanning control transistor is electrically connected to the $n^{th}$-level pull-down node. A first terminal of the second scanning storage capacitor is electrically connected to the $n^{th}$-level pull-down node, and a second terminal of the second scanning storage capacitor is electrically connected to the $n^{th}$-level gate driving signal output terminal.

In the embodiments of the present disclosure, the $n^{th}$-level gate driving signal output circuit may include a seventh scanning control transistor and an eighth scanning control transistor. A control electrode of the seventh scanning control transistor is electrically connected to the $n^{th}$-level pull-up node, a first electrode of the seventh scanning control transistor is electrically connected to the second voltage terminal, and a second electrode of the seventh scanning control transistor is electrically connected to the $n^{th}$-level gate driving signal output terminal. A control electrode of the eighth scanning control transistor is electrically connected to the $n^{th}$-level pull-down node, a first electrode of the eighth scanning control transistor is electrically connected to the $n^{th}$-level gate driving signal output terminal, and a second electrode of the eighth scanning control transistor is electrically connected to the second clock signal terminal.

Figure 7:
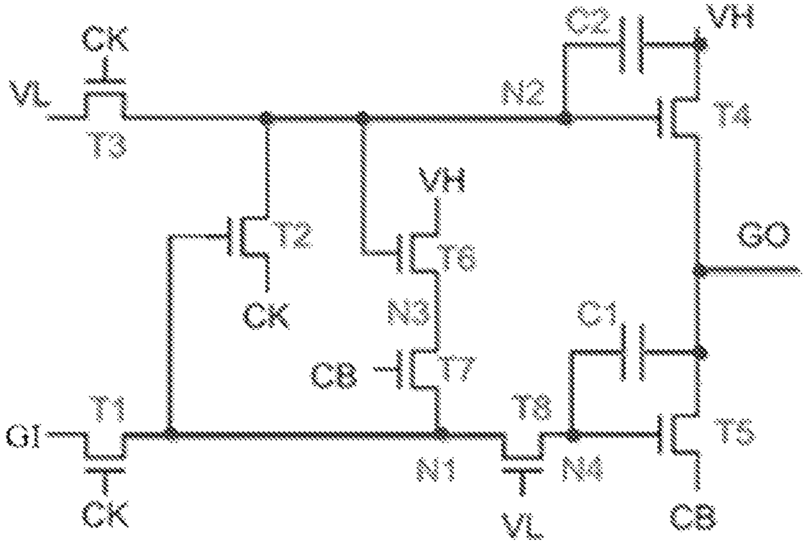
FIG. 7 is a circuit diagram of the $n^{th}$-level shift register unit.

As shown in FIG. 7, on the basis of the $n^{th}$-level shift register unit in FIG. 6, the $n^{th}$-level pull-up node control circuit may include a first scanning control transistor T3, a second scanning control transistor T2 and a first scanning storage capacitor C2.

A gate electrode of the first scanning control transistor T3 is electrically connected to the first clock signal terminal CK, a source electrode of the first scanning control transistor T3 receives a first low voltage VL, and a drain electrode of the first scanning control transistor T3 is electrically connected to the $n^{th}$-level pull-up node N2.

A gate electrode of the second scanning control transistor T2 is electrically connected to the $n^{th}$-level pull-down control node N1, a source electrode of the second scanning control transistor T2 is electrically connected to the $n^{th}$-level pull-up node N2, and a drain electrode of the second scanning control transistor T2 is electrically connected to the first clock signal terminal CK.

A first terminal of the first scanning storage capacitor C2 is electrically connected to the $n^{th}$-level pull-up node N2, and a second terminal of the first scanning storage capacitor C2 receives a first high voltage VH.

The $n^{th}$-level pull-down control node control circuit may include a third scanning control transistor T1, a fourth scanning control transistor T6 and a fifth scanning control transistor T7.

A gate electrode of the third scanning control transistor T1 is electrically connected to the first clock signal terminal CK, a source electrode of the third scanning control transistor T1 is electrically connected to the input terminal GI, and a drain electrode of the third scanning control transistor T1 is electrically connected to the $n^{th}$-level pull-down control node N1.

A gate electrode of the fourth scanning control transistor T6 is electrically connected to the $n^{th}$-level pull-up node N2, and a source electrode of the fourth scanning control transistor T6 receives the first high voltage VH.

A gate electrode of the fifth scanning control transistor T7 is electrically connected to the second clock signal terminal CB, a source electrode of the fifth scanning control transistor T7 is electrically connected to a drain electrode of the fourth scanning control transistor T6, and a drain electrode of the fifth scanning control transistor T7 is electrically connected to the $n^{th}$-level pull-down control node N1.

The $n^{th}$-level pull-down node control circuit may include a sixth scanning control transistor T8 and a second scanning storage capacitor C1.

A gate electrode of the sixth scanning control transistor T8 receives the first low voltage, a source electrode of the sixth scanning control transistor T8 is electrically connected to the $n^{th}$-level pull-down control node N1, and a drain electrode of the sixth scanning control transistor T8 is electrically connected to the $n^{th}$-level pull-down node N4.

A first terminal of the second scanning storage capacitor C1 is electrically connected to the $n^{th}$-level pull-down node N4, and a second terminal of the second scanning storage capacitor C1 is electrically connected to the $n^{th}$-level gate electrode driving signal output terminal GO.

The $n^{th}$-level gate driving signal output circuit may include a seventh scanning control transistor T4 and an eighth scanning control transistor T5.

A gate electrode of the seventh scanning control transistor T4 is electrically connected to the $n^{th}$-level pull-up node N2, a source electrode of the seventh scanning control transistor T4 receives the first high voltage VH, and a drain electrode of the seventh scanning control transistor T4 is electrically connected to the $n^{th}$-level gate electrode driving signal output terminal GO.

A gate electrode of the eighth scanning control transistor T5 is electrically connected to the $n^{th}$-level pull-down node N4, a source electrode of the eighth scanning control transistor T5 is electrically connected to the $n^{th}$-level gate electrode driving signal output terminal GO, and a source electrode of the eighth scanning control transistor T5 is electrically connected to the second clock signal terminal CB.

In the embodiment shown in FIG. 7, all transistors are, but not limited to, p-type thin film transistors.

In the embodiments of the present disclosure, the gate driving circuit needs to output a low potential pulse signal in a row-by-row manner, as a result, some basic control signals, including the first high voltage VH, the first low voltage VL, the first clock signal and the second clock signal, are introduced into the gate driving circuit. Assuming that there are pixel circuits in 2N rows in the display device, and the refresh rate is 120 Hz, the display time of the pixel circuits in each row is TH=½N/120, and a period of the first clock signal and a period of the second clock signal are each 2TH.

Figure 8:
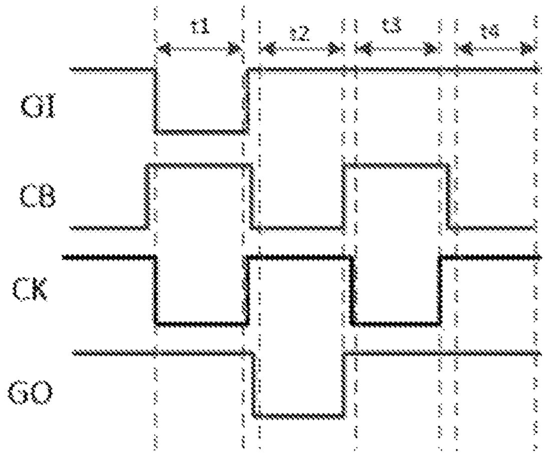
FIG. 8 is an operation sequence diagram of the $n^{th}$-level shift register unit in FIG. 7.

As shown in FIG. 8, when the $n^{th}$-level shift register unit in FIG. 7 is in operation, at an input stage t1, GI applies a low voltage signal (a gate signal output terminal of the $(n-1)^{th}$-level shift register unit is electrically connected to an input terminal GI of the $n^{th}$-level shift register unit), the first clock signal from the CK is a low voltage signal, the second clock signal from the CB is a high voltage signal, T1, T2, T3, T4, T5, T6 and T8 are all turned on, and the GO outputs a high voltage signal.

At an output stage t2, GI applies a high voltage signal, the first clock signal from the CK is a high voltage signal, the second clock signal from the CB is a low voltage signal, T2, T5 and T7 are all turned on, and the GO outputs a low voltage signal.

At a resetting stage t3, GI applies a high voltage signal, the first clock signal from the CK is a low voltage signal, the second clock signal from the CB is a high voltage signal, T1, T3, T4, T6 and T8 are turned on, and the GO outputs a high voltage signal.

At an output-stopping stage t4, GI applies a high voltage signal, the first clock signal from the CK is a high voltage signal, the second clock signal from the CB is a low voltage signal, T4, T6, T7 and T8 are turned on, and the GO outputs a high voltage signal.

Since an input signal from the GI always maintains as a high level before the end of a current frame, potentials at internal nodes of the $n^{th}$-level shift register unit may be switched between two stages of t3 and t4 until that the input signal from the GI is a low voltage signal during a display time of a next frame, and the stage of t1 is entered again.

Figure 9:
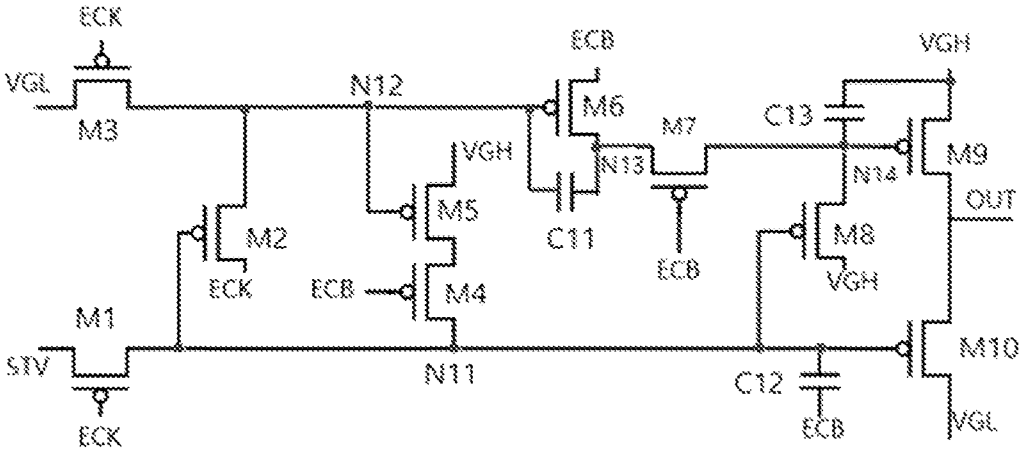
FIG. 9 is a circuit diagram of the light-emitting control unit in the display device according to an embodiment of the present disclosure.

As shown in FIG. 9, the light-emitting control unit may include a first transistor M1, a second transistor M2, a third transistor M3, a fourth transistor M4, a fifth transistor M5, a sixth transistor M6, a seventh transistor M7, an eighth transistor M8, a ninth transistor M9, a tenth transistor M10, a first light-emitting control capacitor C11, a second light-emitting control capacitor C12 and a third light-emitting control capacitor C13.

A gate electrode of the M1 is electrically connected to a third clock signal terminal ECK, a source electrode of the M1 is electrically connected to a start signal terminal STV, and a drain electrode of the M1 is electrically connected to a first node N11.

A gate electrode of the M2 is electrically connected to the first node N11, a source electrode of the M2 is electrically connected to the third clock signal terminal ECK, and a drain electrode of the M2 is electrically connected to a second node N12.

A gate electrode of the M3 is electrically connected to the third clock signal terminal ECK, a source electrode of the M3 is connected to a second low voltage VGL, and a drain electrode of the M3 is electrically connected to the second node N12.

A gate electrode of the M4 is electrically connected to a fourth clock signal terminal ECB, and a source electrode of the M4 is electrically connected to the first node N11.

A gate electrode of the M5 is electrically connected to the second node N12, a source electrode of the M5 receives a second high voltage VGH, and a drain electrode of M5 is electrically connected to a drain electrode of the M4.

A gate electrode of the M6 is electrically connected to the second node N12, a source electrode of the M6 is electrically connected to the fourth clock signal terminal ECB, and a drain electrode of the M6 is electrically connected to a third node N13.

A gate electrode of the M7 is electrically connected to the fourth clock signal terminal ECB, a source electrode of the M7 is connected to the third node N13, and a drain electrode of the M7 is electrically connected to a fourth node N14.

A gate electrode of the M8 is electrically connected to the first node N11, a source electrode of the M8 receives the second high voltage VGH, and a drain electrode of the M8 is electrically connected to the fourth node N14.

A gate electrode of the M9 is electrically connected to the fourth node N14, a source electrode of the M9 receives the second high voltage VGH, and a drain electrode of the M9 is electrically connected to a light-emitting control signal output terminal OUT.

A gate electrode of the M10 is electrically connected to the first node N11, a source electrode of the M10 receives the second low voltage VGL, and a drain electrode of the M10 is electrically connected to the light-emitting control signal output terminal OUT.

A first terminal of the C11 is electrically connected to the second node N12, and a second terminal of the C11 is electrically connected to the third node N13.

A first terminal of the C12 is electrically connected to the first node N11, and a second terminal of the C12 is electrically connected to the fourth clock signal terminal ECB.

A first terminal of the C13 is electrically connected to the fourth node N14, and a second terminal of the C13 receives the second high voltage VGH.

In the light-emitting control unit in FIG. 9, each transistor is, but not limited to, a p-type thin film transistor.

Figure 10:
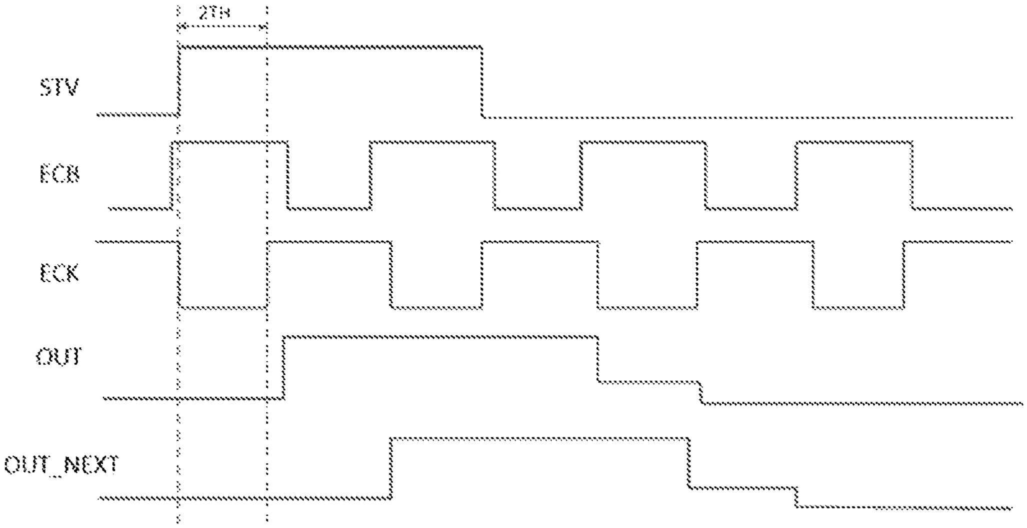
FIG. 10 is an operation sequence diagram of the light-emitting control unit in FIG. 9.

FIG. 10 is an operation sequence diagram of the light-emitting control unit in FIG. 9. In FIG. 10, OUT NEXT is a light-emitting control signal terminal of a next-level light-emitting control terminal unit.

Figure 11:
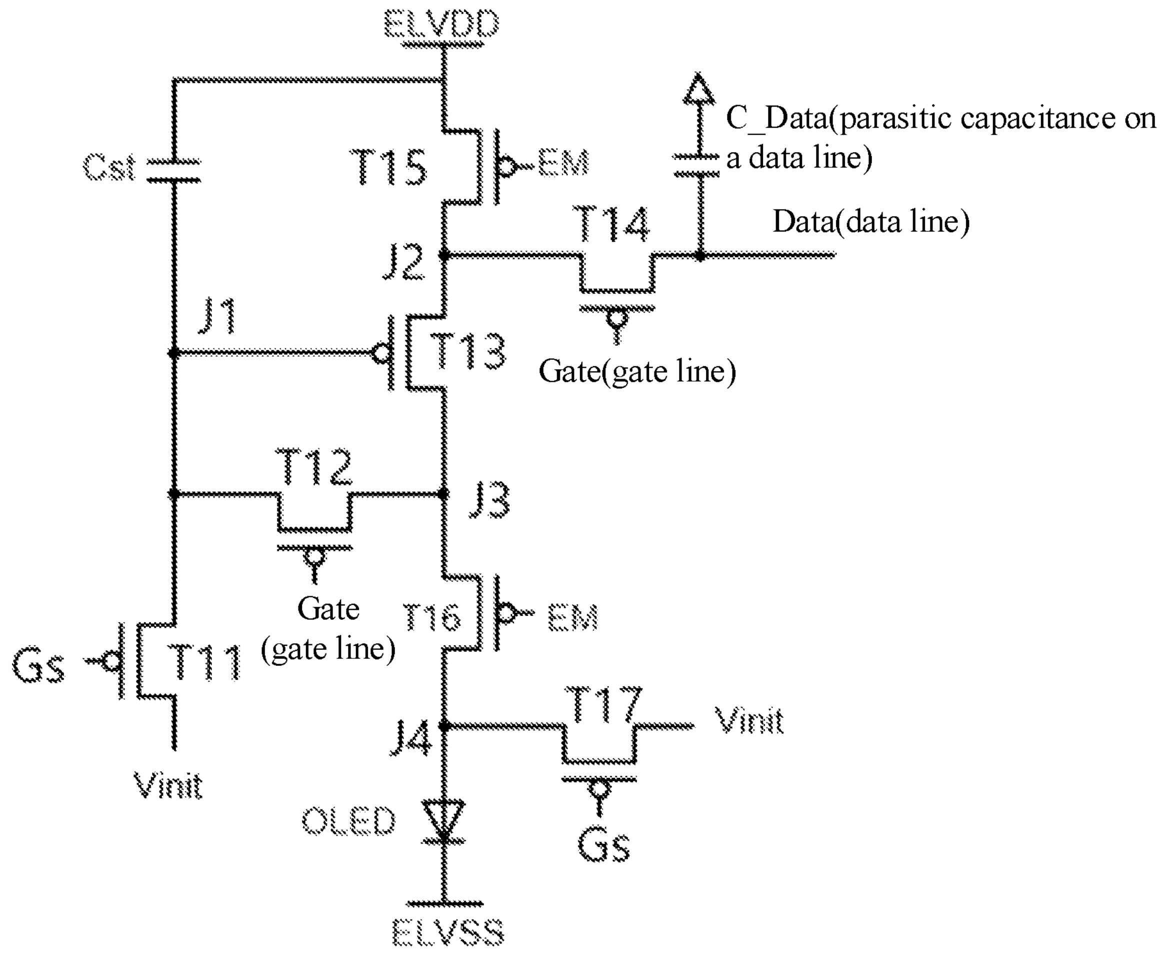
FIG. 11 is a circuit diagram of a pixel circuit in the display device according to an embodiment of the present disclosure.

FIG. 11 is a circuit diagram of a pixel circuit in the display device according to an embodiment of the present disclosure. The pixel circuit in FIG. 11 is of a 7T1C structure which is a mainstream structure in the current OLED (Organic Light Emitting Diode) display product.

In the pixel circuit shown in FIGS. 11, T12 and T14 are electrically connected to a current gate line, and the current gate line is electrically connected to a corresponding level shift register unit in the gate driving circuit. T11 and T17 are electrically connected to a previous gate line, and the previous gate line is electrically connected to a previous-level shift register unit in the gate driving circuit. T15 and T16 are electrically connected to a light-emitting control line in a current row, and the light-emitting control line in the current row is electrically connected to a corresponding level light-emitting control unit in the light-emitting control circuit. T12, T14, T11, T17, T15 and T16 are each used as a switch, T13 is controlled by a data voltage signal, and T13 drives an OLED to emit light.

As shown in FIG. 11, in the embodiments of the present disclosure, each pixel circuit may include a first pixel transistor T11, a second pixel transistor T12, a third pixel transistor T13, a fourth pixel transistor T14, a fifth pixel transistor T15, a sixth pixel transistor T16, a seventh pixel transistor T17, a storage capacitor Cst and an organic light-emitting diode (OLED).

In FIG. 11, C_Data denotes a parasitic capacitance on a data line Data.

A gate electrode of the T11 is electrically connected to a previous gate line Gs, a source electrode of the T11 is connected to an initial voltage signal Vinit, and a drain electrode of the T11 is electrically connected to a first control node J1.

A gate electrode of the T12 is electrically connected to a current gate line Gate, a source electrode of the T12 is electrically connected to the first control node J1, and a drain electrode of the T12 is electrically connected to a third control node J3.

A gate electrode of the T13 is electrically connected to the first control node J1, a source electrode of the T13 is electrically connected to a second control node J2, and a drain electrode of the T13 is electrically connected to the third control node J3.

A gate electrode of the T14 is electrically connected to the current gate line Gate, a source electrode of the T14 is electrically connected to the second control node J2, and a drain electrode of the T14 is electrically connected to the data line Data.

A gate electrode of the T15 is electrically connected to a light-emitting control line EM in a current row, a source electrode of the T15 is connected to a first driving voltage signal ELVDD, and a drain electrode of the T15 is electrically connected to the second control node J2.

A gate electrode of the T16 is electrically connected to the light-emitting control line EM in the current row, a source electrode of the T16 is electrically connected to the third control node J3, and a drain electrode of the T16 is electrically connected to a fourth control node J4.

A gate electrode of the T17 is electrically connected to the previous gate line Gs, a source electrode of the T17 is connected to the initial voltage signal Vinit, and a drain electrode of the T17 is electrically connected to the fourth control node J4.

An anode of OLED is electrically connected to the fourth control node J4, and a cathode of OLED is connected to a second driving voltage signal ELVSS.

In the pixel circuit shown in FIG. 11, each transistor is, but not limited to, a p-type thin film transistor.

Figure 12:
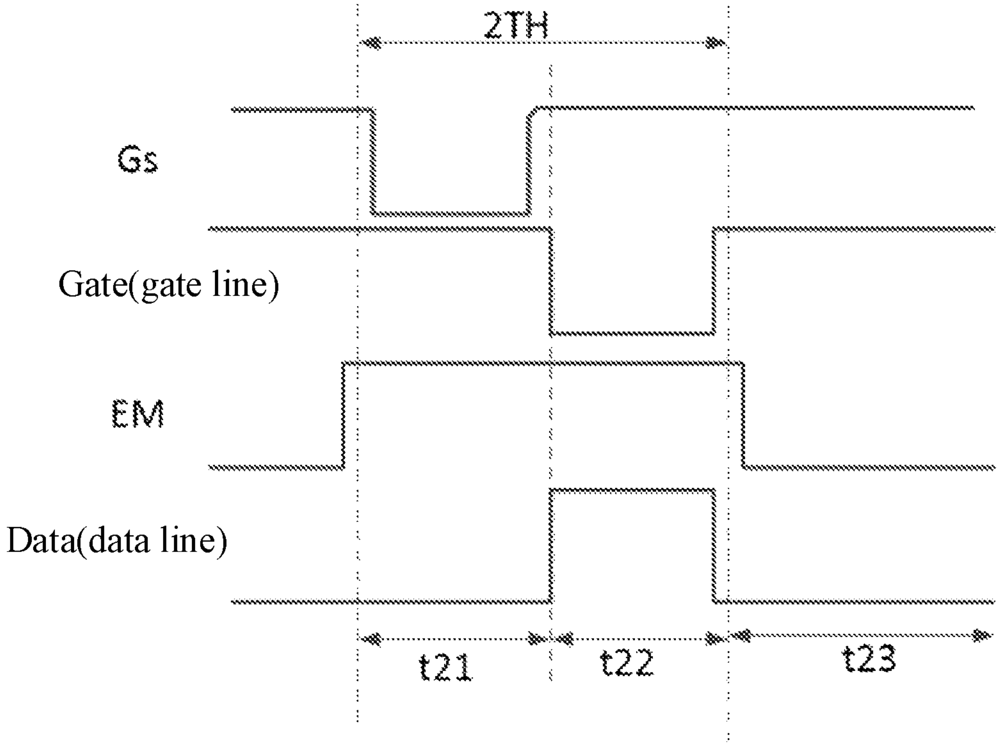
FIG. 12 is an operation sequence diagram of the pixel circuit in FIG. 11.

FIG. 12 is an operation sequence diagram of the pixel circuit in FIG. 11. As shown in FIG. 12, when the pixel circuit in FIG. 11 is in operation, before a first time period t21, EM applies a low voltage signal, Gate applies a high voltage signal, and at this time, the pixel circuit emits light in accordance with a data voltage signal being written-in previously.

During the first time period t21, EM applies a high voltage signal, Gs applies a low voltage signal, T15 and T16 are turned off, the OLED stops emitting light, both T11 and T17 are turned on, a potential at J1 is reset to Vinit, and a potential at J4 is set to Vinit.

During a second time period t22, Gs applies a high voltage signal, Gate applies a low voltage signal, EM applies a high voltage signal, T11 is turned off, T12 and T14 are turned on, and the Cst is charged through a data voltage Vdata from the Data until the potential at J1 becomes Vdata-Vth, where Vth is a threshold voltage of T3.

During a third time period t23, Gs applies a high voltage signal, Gate applies a high voltage signal, EM applies a low voltage signal, T5 and T6 are turned on, and T3 drives the OLED to emit light until t21 in a display time of a next frame arrives.

In the embodiments of the present disclosure, the method for driving the above-mentioned display driving module includes: controlling, by the first multiplexing sub-circuit, the data driver to apply corresponding data voltages to the data lines electrically connected to the pixel circuits in odd-numbered rows and odd-numbered columns and the data lines electrically connected to the pixel circuits in even-numbered rows and even-numbered columns under the control of the first multiplexing control signal from the first multiplexing control terminal; controlling, by the second multiplexing sub-circuit, the data driver to apply corresponding data voltages to the data lines electrically connected to the pixel circuits in odd-numbered rows and even-numbered columns and the data lines electrically connected to the pixel circuits in even-numbered rows and odd-numbered columns under the control of the second multiplexing control signal from the second multiplexing control terminal. The $n^{th}$-level shift register unit applies the same gate driving signal to the pixel circuits in the $(2n-1)^{th}$ row and the $(2n)^{th}$ row, where n is a positive integer.

In the embodiments of the present disclosure, the display device includes the above-mentioned display driving module.

The display device in the embodiments of the present disclosure may be any product or member having a display function, e.g., mobile phone, flat-panel computer, television, display, laptop computer, digital photo frame or navigator.

The above embodiments are for illustrative purposes only, but the present disclosure is not limited thereto. Apparently, a person skilled in the art may make further modifications and improvements without departing from the spirit of the present disclosure, and these modifications and improvements shall also fall within the scope of the present disclosure.

What is claimed is:

1. A display driving module, applied to a display device, wherein the display device comprises pixel circuits in multiple rows and multiple columns, the display driving module comprises a gate driving circuit, a plurality of data lines and a data driving circuit, wherein, the pixel circuits in odd-numbered rows and one column are electrically connected to a data line, and the pixel circuits in even-numbered rows and the one column are electrically connected to another data line;

the data driving circuit comprises a data driver and a multiplexing circuit, wherein the multiplexing circuit comprises a first multiplexing sub-circuit and a second multiplexing sub-circuit;

the first multiplexing sub-circuit is electrically connected to a first multiplexing control terminal, the data driver, the data lines electrically connected to the pixel circuits in odd-numbered rows and odd-numbered columns, and the data lines electrically connected to the pixel circuits in even-numbered rows and even-numbered columns, and configured to control the data driver to apply corresponding data voltages to the data lines electrically connected to the pixel circuits in odd-numbered rows and odd-numbered columns and the data lines electrically connected to the pixel circuits in even-numbered rows and even-numbered columns under the control of a first multiplexing control signal from the first multiplexing control terminal;

the second multiplexing sub-circuit is electrically connected to a second multiplexing control terminal, the data driver, the data lines electrically connected to the pixel circuits in odd-numbered rows and even-numbered columns and the data lines electrically connected to the pixel circuits in even-numbered rows and odd-numbered columns, and configured to control the data driver to apply corresponding data voltages to the data lines electrically connected to the pixel circuits in odd-numbered rows and even-numbered columns and the data lines electrically connected to the pixel circuits in even-numbered rows and odd-numbered columns under the control of a second multiplexing control signal from the second multiplexing control terminal;

the gate driving circuit comprises a plurality of levels of shift register units; and an $n^{th}$-level shift register unit is electrically connected to the pixel circuits in a $(2n-1)^{th}$ row and a $(2n)^{th}$ row, and configured to apply a same gate driving signal to the pixel circuits in the $(2n-1)^{th}$ row and the $(2n)^{th}$ row, where n is a positive integer;

wherein the $n^{th}$-level shift register unit comprises an $n^{th}$-level pull-up node control circuit, an $n^{th}$-level pull-down control node control circuit, an $n^{th}$-level pull-down node control circuit and an $n^{th}$-level gate driving signal output circuit, wherein, the $n^{th}$-level pull-up node control circuit is electrically connected to a first clock signal terminal, a first voltage terminal, an $n^{th}$-level pull-up node and an $n^{th}$-level pull-down control node, and configured to control the $n^{th}$-level pull-up node to be electrically connected to the first voltage terminal under the control of a first clock signal from the first clock signal terminal, and control the $n^{th}$-level pull-up node to be electrically connected to the first clock signal terminal and maintain a potential at the $n^{th}$-level pull-up node under the control of a potential at the $n^{th}$-level pull-down control node;

the $n^{th}$-level pull-down control node control circuit is electrically connected to an input terminal, the first clock signal terminal, a second clock signal terminal, the $n^{th}$-level pull-up node, a second voltage terminal and the $n^{th}$-level pull-down control node, and configured to control the $n^{th}$-level pull-down control node to be electrically connected to the input terminal under the control of the first clock signal, control the $n^{th}$-level pull-down control node to be electrically connected to the second voltage terminal under the control of the potential at the $n^{th}$-level pull-up node and a second clock signal from the second clock signal terminal;

the $n^{th}$-level pull-down node control circuit is electrically connected to the $n^{th}$-level pull-down control node, the first voltage terminal and the $n^{th}$-level pull-down node, and configured to control the $n^{th}$-level pull-down control node to be electrically connected to the $n^{th}$-level pull-down node and maintain a potential at the $n^{th}$-level pull-down node under the control of a first voltage signal from the first voltage terminal;

the $n^{th}$-level gate driving signal output circuit is electrically connected to the $n^{th}$-level pull-up node, the $n^{th}$-level pull-down node, the second voltage terminal, the second clock signal terminal and an $n^{th}$-level gate driving signal output terminal, and configured to control the $n^{th}$-level gate driving signal output terminal to be electrically connected to the second voltage terminal under the control of the potential at the $n^{th}$-level pull-up node, and control the $n^{th}$-level gate driving signal output terminal to be electrically connected to the second clock signal terminal under the control of the potential at the $n^{th}$-level pull-down node; and the $n^{th}$-level gate driving signal output terminal is electrically connected to the pixel circuits in the $(2n-1)^{th}$ row and the $(2n)^{th}$ row.

2. The display driving module according to claim 1, wherein the pixel circuits in odd-numbered rows and a $(2m-1)^{th}$ column are electrically connected to a $(4m-3)^{th}$ data line, the pixel circuits in even-numbered rows and the $(2m-1)^{th}$ column are electrically connected to a $(4m-2)^{th}$ data line, the pixel circuits in even-numbered rows and a $(2m)^{th}$ column are electrically connected to a $(4m-1)^{th}$ data line, the pixel circuits in odd-numbered rows and the $(2m)^{th}$ column are electrically connected to a $(4m)^{th}$ data line, where m is a positive integer.

3. The display driving module according to claim 2, wherein the first multiplexing sub-circuit comprises at least one first multiplexing transistor and at least one second multiplexing transistor;

a control electrode of the first multiplexing transistor is electrically connected to the first multiplexing control terminal, a first electrode of the first multiplexing transistor is electrically connected to the $(4m-3)^{th}$ data line, and a second electrode of the first multiplexing transistor is electrically connected to the data driver; and a control electrode of the second multiplexing transistor is electrically connected to the first multiplexing control terminal, a first electrode of the second multiplexing transistor is electrically connected to the $(4m)^{th}$ data line, and a second electrode of the second multiplexing transistor is electrically connected to the data driver.

4. The display driving module according to claim 3, wherein the second multiplexing sub-circuit comprises at least one third multiplexing transistor and at least one fourth multiplexing transistor;

a control electrode of the third multiplexing transistor is electrically connected to the second multiplexing control terminal, a first electrode of the third multiplexing transistor is electrically connected to the $(4m-2)^{th}$ data line, and a second electrode of the third multiplexing transistor is electrically connected to the data driver; and a control electrode of the fourth multiplexing transistor is electrically connected to the second multiplexing control terminal, a first electrode of the fourth multiplexing transistor is electrically connected to the $(4m-1)^{th}$ data line, and a second electrode of the fourth multiplexing transistor is electrically connected to the data driver.

5. The display driving module according to claim 1, wherein the pixel circuits in even-numbered rows and a $(2m-1)^{th}$ column are electrically connected to a $(4m-3)^{th}$ data line, the pixel circuits in odd-numbered rows and the $(2m-1)^{th}$ column are electrically connected to a $(4m-2)^{th}$ data line, the pixel circuits in even-numbered rows and a $(2m)^{th}$ column are electrically connected to a $(4m-1)^{th}$ data line, the pixel circuits in odd-numbered rows and the $(2m)^{th}$ column are electrically connected to a $(4m)^{th}$ data line, where m is a positive integer.

6. The display driving module according to claim 5, wherein the first multiplexing sub-circuit comprises at least one first multiplexing transistor and at least one second multiplexing transistor;

a control electrode of the first multiplexing transistor is electrically connected to the first multiplexing control terminal, a first electrode of the first multiplexing transistor is electrically connected to the $(4m-2)^{th}$ data line, and a second electrode of the first multiplexing transistor is electrically connected to the data driver; and a control electrode of the second multiplexing transistor is electrically connected to the first multiplexing control terminal, a first electrode of the second multiplexing transistor is electrically connected to the $(4m-1)^{th}$ data line, and a second electrode of the second multiplexing transistor is electrically connected to the data driver.

7. The display driving module according to claim 6, wherein the second multiplexing sub-circuit comprises at least one third multiplexing transistor and at least one fourth multiplexing transistor;

a control electrode of the third multiplexing transistor is electrically connected to the second multiplexing control terminal, a first electrode of the third multiplexing transistor is electrically connected to the $(4m-3)^{th}$ data line, and a second electrode of the third multiplexing transistor is electrically connected to the data driver; and a control electrode of the fourth multiplexing transistor is electrically connected to the second multiplexing control terminal, a first electrode of the fourth multiplexing transistor is electrically connected to the $(4m)^{th}$ data line, and a second electrode of the fourth multiplexing transistor is electrically connected to the data driver.

8. The display driving module according to claim 1, wherein the $n^{th}$-level shift register unit comprises a first one of $n^{th}$-level shift register modules and a second one of $n^{th}$-level shift register modules; the pixel circuits are arranged in an active display region;

the first one of the $n^{th}$-level shift register modules is located at a first side of the active display region, and configured to apply the same gate driving signal to the pixel circuits in the $(2n-1)^{th}$ row and the $(2n)^{th}$ row; and the second one of the $n^{th}$-level shift register modules is located at a second side of the active display region, and configured to apply the same gate driving signal to the pixel circuits in the $(2n-1)^{th}$ row and the $(2n)^{th}$ row.

9. The display driving module according to claim 1, further comprising a light-emitting control circuit; wherein the light-emitting control circuit comprises a plurality of levels of light-emitting control units, and an $n^{th}$-level light-emitting control unit is electrically connected to the pixel circuits in the $(2n-1)^{th}$ row and the $(2n)^{th}$ row, and configured to apply a same light-emitting control signal to the pixel circuits in the $(2n-1)^{th}$ row and the $(2n)^{th}$ row, where n is a positive integer.

10. The display driving module according to claim 1, wherein the $n^{th}$-level pull-up node control circuit comprises a first scanning control transistor, a second scanning control transistor and a first scanning storage capacitor;

a control electrode of the first scanning control transistor is electrically connected to the first clock signal terminal, a first electrode of the first scanning control transistor is electrically connected to the first voltage terminal, and a second electrode of the first scanning control transistor is electrically connected to the $n^{th}$-level pull-up node;

a control electrode of the second scanning control transistor is electrically connected to the $n^{th}$-level pull-down control node, a first electrode of the second scanning control transistor is electrically connected to the $n^{th}$-level pull-up node, and a second electrode of the second scanning control transistor is electrically connected to the first clock signal terminal; and a first terminal of the first scanning storage capacitor is electrically connected to the $n^{th}$-level pull-up node, and a second terminal of the first scanning storage capacitor is electrically connected to the second voltage terminal.

11. The display driving module according to claim 1, wherein the $n^{th}$-level pull-down control node control circuit comprises a third scanning control transistor, a fourth scanning control transistor and a fifth scanning control transistor;

a control electrode of the third scanning control transistor is electrically connected to the first clock signal terminal, a first electrode of the third scanning control transistor is electrically connected to the input terminal, and a second electrode of the third scanning control transistor is electrically connected to the $n^{th}$-level pull-down control node;

a control electrode of the fourth scanning control transistor is electrically connected to the $n^{th}$-level pull-up node, and a first electrode of the fourth scanning control transistor is electrically connected to the second voltage terminal; and a control electrode of the fifth scanning control transistor is electrically connected to the second clock signal terminal, a first electrode of the fifth scanning control transistor is electrically connected to a second electrode of the fourth scanning control transistor, and a second electrode of the fifth scanning control transistor is electrically connected to the $n^{th}$-level pull-down control node.

12. The display driving module according to claim 1, wherein the $n^{th}$-level pull-down node control circuit comprises a sixth scanning control transistor and a second scanning storage capacitor;

a control electrode of the sixth scanning control transistor is electrically connected to the first voltage terminal, a first electrode of the sixth scanning control transistor is electrically connected to the $n^{th}$-level pull-down control node, and a second electrode of the sixth scanning control transistor is electrically connected to the $n^{th}$-level pull-down node; and a first terminal of the second scanning storage capacitor is electrically connected to the $n^{th}$-level pull-down node, and a second terminal of the second scanning storage capacitor is electrically connected to the $n^{th}$-level gate driving signal output terminal.

13. The display driving module according to claim 1, wherein the $n^{th}$-level gate driving signal output circuit comprises a seventh scanning control transistor and an eighth scanning control transistor, wherein, a control electrode of the seventh scanning control transistor is electrically connected to the $n^{th}$-level pull-up node, a first electrode of the seventh scanning control transistor is electrically connected to the second voltage terminal, and a second electrode of the seventh scanning control transistor is electrically connected to the $n^{th}$-level gate driving signal output terminal; and a control electrode of the eighth scanning control transistor is electrically connected to the $n^{th}$-level pull-down node, a first electrode of the eighth scanning control transistor is electrically connected to the $n^{th}$-level gate driving signal output terminal, and a second electrode of the eighth scanning control transistor is electrically connected to the second clock signal terminal.

14. A method for driving the display driving module according to claim 1, comprising:

controlling, by the first multiplexing sub-circuit, the data driver to apply corresponding data voltages to the data lines electrically connected to the pixel circuits in odd-numbered rows and odd-numbered columns and the data lines electrically connected to the pixel circuits in even-numbered rows and even-numbered columns under the control of the first multiplexing control signal from the first multiplexing control terminal;

controlling, by the second multiplexing sub-circuit, the data driver to apply corresponding data voltages to the data lines electrically connected to the pixel circuits in odd-numbered rows and even-numbered columns and the data lines electrically connected to the pixel circuits in even-numbered rows and odd-numbered columns under the control of the second multiplexing control signal from the second multiplexing control terminal;

wherein the $n^{th}$-level shift register unit applies the same gate driving signal to the pixel circuits in the $(2n-1)^{th}$ row and the $(2n)^{th}$ row, where n is a positive integer.

15. A display device comprising the display driving module according to claim 1.

16. The method for driving the display driving module according to claim 14, wherein the $n^{th}$-level shift register unit applies the same gate driving signal to the pixel circuits in the $(2n-1)^{th}$ row and the $(2n)^{th}$ row simultaneously.

17. The display device according to claim 15, wherein the pixel circuits in odd-numbered rows and a $(2m-1)^{th}$ column are electrically connected to a $(4m-3)^{th}$ data line, the pixel circuits in even-numbered rows and the $(2m-1)^{th}$ column are electrically connected to a $(4m-2)^{th}$ data line, the pixel circuits in even-numbered rows and a $(2m)^{th}$ column are electrically connected to a $(4m-1)^{th}$ data line, the pixel circuits in odd-numbered rows and the $(2m)^{th}$ column are electrically connected to a $(4m)^{th}$ data line, where m is a positive integer.

18. The display device according to claim 15, wherein the pixel circuits in even-numbered rows and a $(2m-1)^{th}$ column are electrically connected to a $(4m-3)^{th}$ data line, the pixel circuits in odd-numbered rows and the $(2m-1)^{th}$ column are electrically connected to a $(4m-2)^{th}$ data line, the pixel circuits in even-numbered rows and a $(2m)^{th}$ column are electrically connected to a $(4m-1)^{th}$ data line, the pixel circuits in odd-numbered rows and the $(2m)^{th}$ column are electrically connected to a $(4m)^{th}$ data line, where m is a positive integer.

* * * * *